United States Patent
Okida et al.

(10) Patent No.: US 12,460,789 B2
(45) Date of Patent: Nov. 4, 2025

(54) LIGHT TRANSMISSIVE MEMBER, LIGHT SOURCE DEVICE, METHOD OF PRODUCING LIGHT TRANSMISSIVE MEMBER, AND METHOD OF PRODUCING LIGHT SOURCE DEVICE

(71) Applicant: NICHIA CORPORATION, Anan (JP)

(72) Inventors: Keiji Okida, Anan (JP); Takaaki Tada, Itano-gun (JP); Kohei Kunimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/887,227

(22) Filed: Sep. 17, 2024

(65) Prior Publication Data

US 2025/0093010 A1 Mar. 20, 2025

(30) Foreign Application Priority Data

Sep. 20, 2023 (JP) .................................. 2023-153915
Mar. 25, 2024 (JP) .................................. 2024-048004

(51) Int. Cl.
| | |
|---|---|
| *F21V 3/06* | (2018.01) |
| *F21V 5/00* | (2018.01) |
| *F21V 5/04* | (2006.01) |
| *F21Y 103/10* | (2016.01) |

(52) U.S. Cl.
CPC ................ *F21V 3/06* (2018.02); *F21V 5/008* (2013.01); *F21V 5/045* (2013.01); *F21Y 2103/10* (2016.08)

(58) Field of Classification Search
CPC ............ F21V 3/06; F21V 5/008; F21V 5/045
See application file for complete search history.

(56) References Cited

U.S. PATENT DOCUMENTS

| | | | |
|---|---|---|---|
| 12,352,426 B2 * | 7/2025 | Yoshida | ................... F21V 23/04 |
| 2006/0199040 A1 | 9/2006 | Yamada et al. | |
| 2010/0247758 A1 | 9/2010 | Nakayama et al. | |
| 2017/0001905 A1 | 1/2017 | Sonoda et al. | |
| 2020/0240011 A1 | 7/2020 | Kauppinen et al. | |
| 2023/0022852 A1 | 1/2023 | Lee et al. | |
| 2025/0093012 A1 * | 3/2025 | Matsuoka | ............... F21V 5/048 |
| 2025/0129930 A1 * | 4/2025 | Okahisa | .................... F21V 5/04 |
| 2025/0204112 A1 * | 6/2025 | Eguchi | ................. H10H 20/856 |

(Continued)

FOREIGN PATENT DOCUMENTS

| | | |
|---|---|---|
| CN | 112213803 A | 1/2021 |
| JP | 2006-259711 A | 9/2006 |

(Continued)

*Primary Examiner* — Christopher E Dunay
(74) *Attorney, Agent, or Firm* — Foley & Lardner LLP

(57) ABSTRACT

A light transmissive member, a light source device, a method of producing a light transmissive member, and a method of producing a light source device, which can suppress occurrence of damage, are provided. The light transmissive member includes a light transmissive base member having a first surface and a second surface positioned on a side opposite to the first surface, a light transmissive first film covering the first surface, a light transmissive second film covering the second surface, and a light transmissive third film provided over the second film. The first film contains hydrous alumina. The second film contains aluminum oxide having a crystallinity lower than that of α-alumina. Hardness of the third film is higher than hardness of the second film.

9 Claims, 15 Drawing Sheets

(56) References Cited

U.S. PATENT DOCUMENTS

| | | | |
|---|---|---|---|
| 2025/0207756 A1* | 6/2025 | Endo | F21V 3/0625 |
| 2025/0212568 A1* | 6/2025 | Shichijo | H10H 20/882 |

FOREIGN PATENT DOCUMENTS

| | | |
|---|---|---|
| JP | 2010-066681 A | 3/2010 |
| JP | 2010-254553 A | 11/2010 |
| JP | 2015-114381 A | 6/2015 |
| JP | 2015-184403 A | 10/2015 |
| JP | 2020-537188 A | 12/2020 |

\* cited by examiner

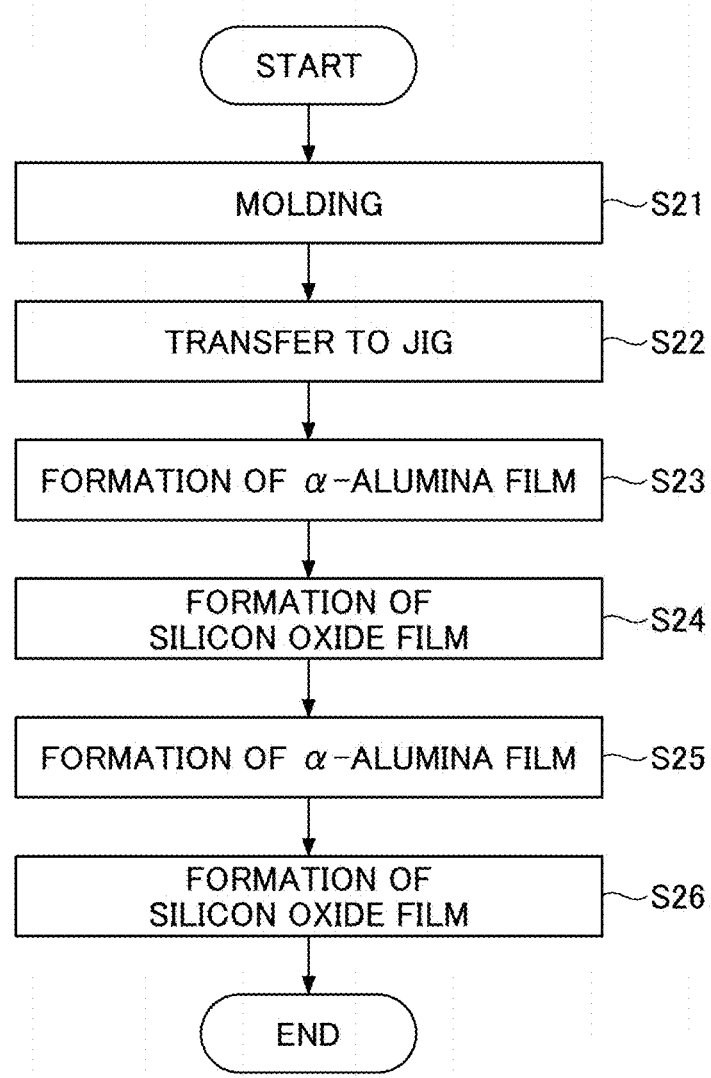

LIGHT TRANSMISSIVE MEMBER, LIGHT SOURCE DEVICE, METHOD OF PRODUCING LIGHT TRANSMISSIVE MEMBER, AND METHOD OF PRODUCING LIGHT SOURCE DEVICE

CROSS-REFERENCE TO RELATED APPLICATIONS

The present application claims priority under 35 U.S.C. § 119 to Japanese Patent Application No. 2023-153915, filed Sep. 20, 2023, and Japanese Patent Application No. 2024-048004, filed Mar. 25, 2024. The entire contents of these applications are incorporated herein by reference.

BACKGROUND

The present disclosure relates to a light transmissive member, a light source device, a method of producing a light transmissive member, and a method of producing a light source device.

Hitherto, a technique of forming a grass-like alumina film on the entirety of the surface of an object such as glass, lenses, and the like has been known (see, for example, Japanese Patent Publication No. 2020-537188).

SUMMARY OF THE INVENTION

An object on which a conventional grass-like alumina film is formed is at a risk that the grass-like alumina film is damaged during conveyance and the like.

An object of the present disclosure is to provide a light transmissive member, a light source device, a method of producing a light transmissive member, and a method of producing a light source device, which are highly reliable.

According to an aspect of the present disclosure, a light transmissive member includes a light transmissive base member having a first surface and a second surface positioned on a side opposite to the first surface, a light transmissive first film covering the first surface, a light transmissive second film covering the second surface, and a light transmissive third film provided over the second film, wherein the first film contains hydrous alumina, the second film contains aluminum oxide having a crystallinity lower than that of α-alumina, and hardness of the third film is higher than hardness of the second film.

According to another aspect of the present disclosure, a method of producing a light transmissive member is a method of producing a light transmissive member including a first film, a second film, and a third film. The method includes: providing a light transmissive base member having a first surface and a second surface positioned on a side opposite to the first surface; forming a light transmissive aluminum oxide film to cover the first surface and the second surface, the light transmissive aluminum oxide film containing aluminum oxide having a crystallinity lower than that of α-alumina; forming a light transmissive third film on the aluminum oxide film on the second surface, to obtain an intermediate structure; and hydrating the intermediate structure such that the aluminum oxide film becomes the first film positioned on the first surface and containing hydrous alumina, and becomes the second film positioned on the second surface and containing the aluminum oxide having a crystallinity lower than that of α-alumina.

According to the present disclosure, it is possible to provide a light transmissive member, a light source device, a method of producing a light transmissive member, and a method of producing a light source device, which are highly reliable.

BRIEF DESCRIPTION OF THE DRAWINGS

FIG. 19 is a flowchart illustrating a method for producing a fourth sample.

DETAILED DESCRIPTION

Figure 1:
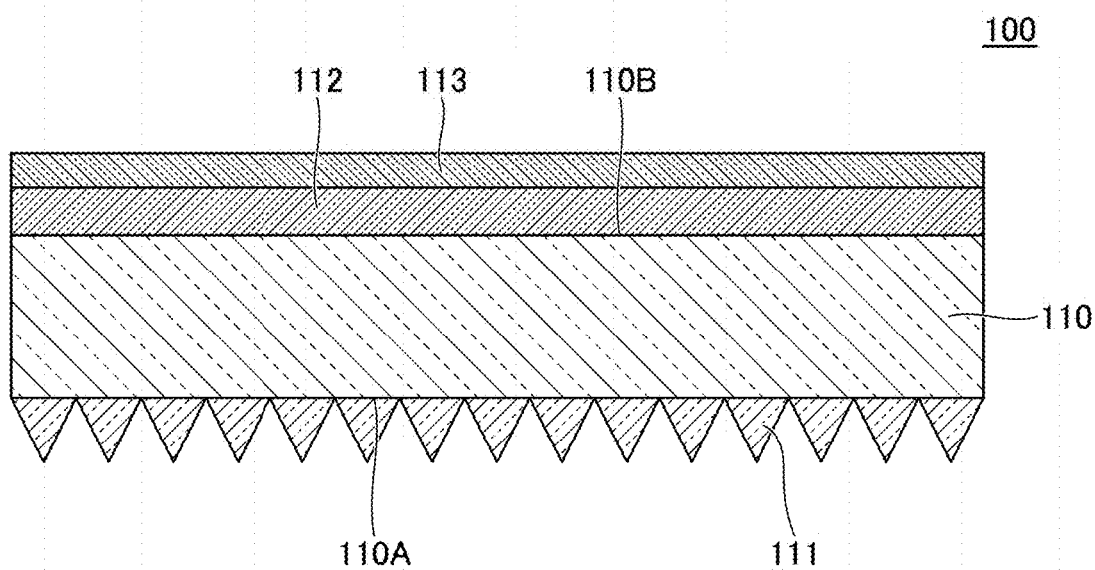
FIG. 1 is a cross-sectional view illustrating a light transmissive member according to a first embodiment.

Embodiments for carrying out the present disclosure will be described below with reference to the drawings. The following descriptions are intended to concretely specify the technical concepts of the present disclosure, and are not meant to limit the present disclosure unless otherwise particularly noted.

In the drawings, components having the same functions may be denoted by the same reference numerals. For illustration of essential points or facilitation of understanding, descriptions may be divided into embodiments. However, the components illustrated in different embodiments or Examples may be partially replaced or combined. In succeeding embodiments, particulars different from what have been described in preceding embodiments will be mainly described, and any particulars that are common to preceding embodiments may not be described repeatedly. The size, positional relationship, and the like of the components illustrated in the drawings may be exaggerated for clarity. End elevations illustrating only cut surfaces may be used as cross-sectional views.

Of a first surface and a second surface of a light transmissive member according to an embodiment, the first surface corresponds to a "lower surface," and the second surface corresponds to an "upper surface." The facing direction of the first surface is defined as a "lower side," and the facing direction of the second surface is defined as an "upper side." This type of an upper or lower positional relationship applies equally to other components according to the embodiments. However, this is not meant to limit the directions or orientations of the light transmissive member and the light source device according to the embodiments during use.

In the specification or claims, a plurality of given components that need to be expressed distinctively may be distinguished from each other by prefixed terms such as "first," "second," and the like. What are mutually distinguished in the specification and what are mutually distinguished in claims may be different. Hence, should components, to which the same prefixed terms as used in the specification are affixed, be defined in claims, what are identified by the components in the claims may be different from the components having the same prefixed terms in the specification.

For example, in a case where the specification includes components distinguished from each other by prefixed terms "first," "second," and "third," and the components to which the prefixed terms "first" and "third" are affixed in the specification are defined in claims, or in a case where a component to which a prefixed term "first" is affixed and a component to which no specific ordinal number is affixed are defined in claims, the components may be distinguished from each other in the claims by prefixed terms "first" and "second" for readability. In this case, the components to which the prefixed terms "first" and "second" are affixed in the claims are meant to indicate the components to which the prefixed terms "first" and "third" are affixed or the component to which no specific ordinal number is affixed in the specification. This rule is applied not only to components but also to any other targets in a reasonable and flexible manner.

First Embodiment

A first embodiment will be described. The first embodiment relates to a light transmissive member.

Structure of the Light Transmissive Member According to the First Embodiment

First, the structure of the light transmissive member according to the first embodiment will be described. FIG. 1 is a cross-sectional view illustrating the light transmissive member according to the first embodiment.

A light transmissive member 100 according to the first embodiment includes a light transmissive base member 110, a light transmissive first film 111, a light transmissive second film 112, and a light transmissive third film 113. Then term "light transmissive" here means that the object has transmittance of 60% or higher with respect to the incident light. The base member 110 has a first surface 110A, and a second surface 110B positioned on a side opposite to the first surface 110A. The first film 111 covers the first surface 110A. The second film 112 covers the second surface 110B. The third film 113 is provided above the second film 112.

In the present embodiment, the first film 111 covers the entirety of the first surface 110A, and the second film 112 covers the entirety of the second surface 110B. The first film 111 is in contact with the first surface 110A, the second film 112 is in contact with the second surface 110B, and the third film 113 is in contact with the second film 112 and covers the entirety of the second surface 110B from above the second film 112. The first film 111 needs only to cover at least a part of the first surface 110A, and the second film 112 needs only to cover at least a part of the second surface 110B.

The base member 110 is light transmissive, and is formed of, for example, a transparent resin such as a polycarbonate resin, an acrylic resin, a silicone resin, an epoxy resin, or the like, or glass. The first film 111 contains hydrous alumina (hydrous aluminum oxide). The composition of the hydrous alumina is represented by $Al_2O_3 \cdot nH_2O$ ($0 < n \leq 3$). The first film 111 may be a hydrous alumina film. In the present embodiment, the first film 111 has a grass-like appearance having minute protrusions and recessions. The second film 112 contains aluminum oxide having a crystallinity lower than that of α-alumina. The second film 112 may be an aluminum oxide film having a crystallinity lower than that of α-alumina. The hardness of the third film 113 is higher than the hardness of the second film 112. "Hardness" in the present disclosure is "Vickers hardness."

The third film 113 contains, for example, silicon oxide. The third film 113 may be a silicon oxide film.

Hydrous alumina in the present embodiment has minute protrusions and recessions. Positioning the hydrous alumina according to the present embodiment between two media having different refractive indices can provide a gradual change (including a linear or curved change) between the refractive indices of the two media, and thus can improve the transmittance of light transmitted through the two media. In the present embodiment, the two media are the base member 110 and the air. Hence, the first film 111 containing the hydrous alumina can reduce light reflection on the first surface 110A.

The minute protrusions and recessions of the hydrous alumina contained in the first film 111 has a convex height that is less than or equal to the wavelength of light to be transmitted therethrough. The minute protrusions and recessions of the hydrous alumina contained in the first film 111 has a spacing distance between convexes adjacent to each other that is less than or equal to the wavelength of light to be transmitted therethrough. The thickness of the first film 111 is preferably 200 nm or greater and 300 nm or less. This can facilitate transmission of visible light described below. The thickness of the second film 112 is not limited. Yet, the thickness of the second film 112 is preferably 25 nm or greater and 45 nm or less. This can improve the transmittance of visible light. The thickness of the third film 113 is preferably 80 nm or greater and 135 nm or less. This can improve the transmittance of visible light.

A light transmissive film containing silicon oxide or the like may be provided between the first film 111 and the base member 110. Moreover, a light transmissive film containing silicon oxide or the like may be provided on the first film 111. The light transmissive film containing silicon oxide or the like can protect the first film 111 and suppress reduction in the light transmittance due to changes in the surface state or condition of the first film 111 in, for example, a high-temperature, high-humidity environment.

Figure 2:
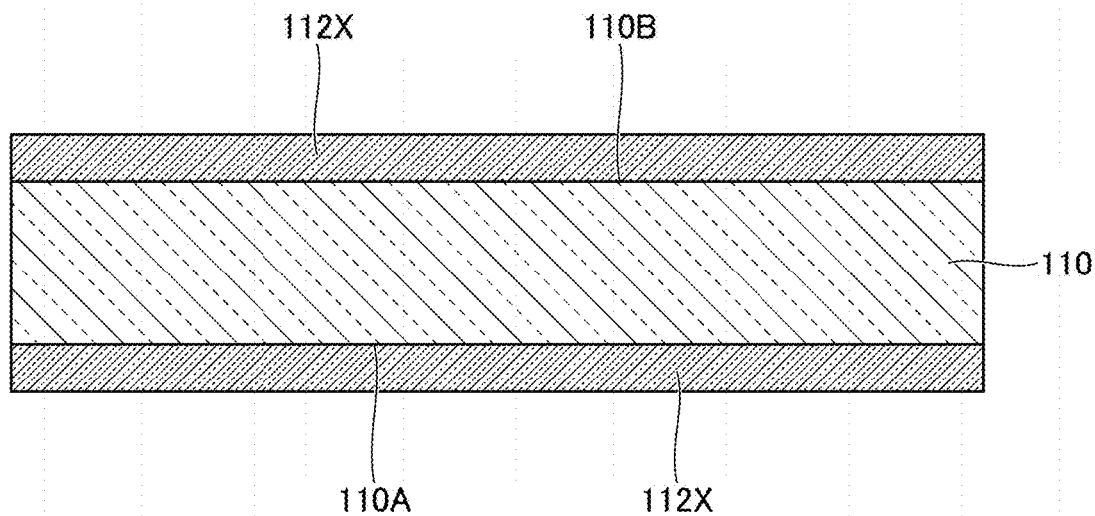
FIG. 2 is a cross-sectional view illustrating a method of producing the light transmissive member according to the first embodiment.
Figure 3:
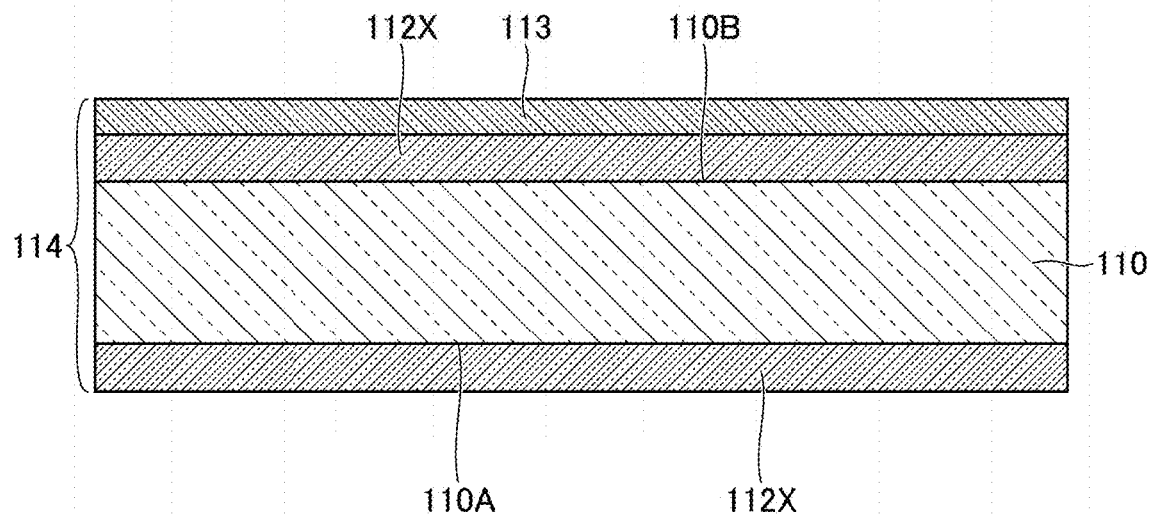
FIG. 3 is a cross-sectional view illustrating the method of producing the light transmissive member according to the first embodiment.

Method of Producing the Light Transmissive Member According to the First Embodiment Next, a method of producing the light transmissive member 100 according to the first embodiment will be described. FIG. 2 to FIG. 3 are cross-sectional views illustrating the method of producing the light transmissive member 100 according to the first embodiment.

The method of producing the light transmissive member 100 according to the first embodiment is a method of producing a light transmissive member including a first film 111, a second film 112, and a third film 113, and includes a step of providing a light transmissive base member 110, a step of forming a light transmissive aluminum oxide film 112X, a step of obtaining an intermediate structure 114, and a step of hydrating the intermediate structure 114.

The step of providing a light transmissive base member 110 is performed. In the step of providing a light transmissive base member 110, a light transmissive base member 110 having a first surface 110A and a second surface 110B as illustrated in FIG. 2 is provided. In the present embodiment, the first surface 110A and the second surface 110B are both flat surfaces. Either or both of the first surface 110A and the second surface 110B may be a coarse surface, and may include either or both of a concave surface and a convex surface. At least one of the first surface 110A and the second surface 110B being a coarse surface with greater coarseness can further improve the light transmittance through the first film 111.

Subsequently, the step of forming a light transmissive aluminum oxide film 112X is performed. In the step of forming a light transmissive aluminum oxide film 112X, a light transmissive aluminum oxide film 112X containing aluminum oxide having a crystallinity lower than that of α-alumina is formed to cover the first surface 110A and the second surface 110B of the base member 110. The aluminum oxide film 112X may be formed by, for example, an Atomic Layer Deposition (ALD) method. The film forming temperature is, for example, 80° C. or higher and 100° C. or lower. The aluminum oxide film 112X formed by the ALD method at approximately 100° C. contains aluminum oxide having a crystallinity lower than that of α-alumina. The aluminum oxide film 112X may contain amorphous aluminum oxide. An example of the aluminum oxide having a crystallinity lower than that of α-alumina is γ-alumina.

Subsequently, the step of obtaining an intermediate structure 114 is performed. In the step of obtaining an intermediate structure 114, a light transmissive third film 113 is formed on the aluminum oxide film 112X on the second surface 110B as illustrated in FIG. 3. The third film 113 may be formed by, for example, a sputtering method or a vapor deposition method. By the sputtering method, a film can be formed at a temperature higher than or equal to normal temperature. By the vapor deposition method, a film can be formed at a temperature higher than or equal to approximately 80° C. Hence, the film forming temperature of the third film 113 is normal temperature (approximately 30° C.) or higher and 100° C. or lower. In a case of using, for example, the ALD method in the formation of the third film, it is possible to form a flat and dense film on an atomic layer level, whereas the third film will be formed on both of the first surface and the second surface, necessitating a mask or the like to be set on the first surface, to complicate the film forming step. In the present embodiment, by use of the sputtering method or the vapor deposition method, the third film 113 is formed on a desired region (i.e., only on the second surface 110B). Hence, the intermediate structure 114 thus obtained includes the base member 110, the aluminum oxide film 112X formed on the first surface 110A of the base member 110, the aluminum oxide film 112X formed on the second surface 110B of the base member 110, and the third film 113 formed on the aluminum oxide film 112X on the second surface 110B.

Subsequently, the step of hydrating the intermediate structure 114 is performed. In this step, the intermediate structure 114 is hydrated. In the step of hydrating the intermediate structure 114, it is preferable to employ the third film 113 harder than the hardness of the second film 112. In the hydration, for example, the intermediate structure 114 is exposed to water or water containing water vapor, having a temperature of 70° C. or higher and 100° C. or lower. Through the hydration, hydrous alumina is produced from the aluminum oxide contained in the aluminum oxide film 112X formed on the first surface 110A. The aluminum oxide may contain aluminum oxide hydroxide (AlO(OH)). In the hydration, for example, the following chemical changes occur.

$$Al_2O_3 + H_2O \rightarrow 2AlO(OH) \quad (1)$$

$$2AlO(OH) \rightarrow Al_2O_3 \cdot H_2O \quad (2)$$

$$2AlO(OH) + 2H_2O \rightarrow Al_2O_3 \cdot 3H_2O \quad (3)$$

$$Al_2O_3 + nH_2O \rightarrow Al_2O_3 \cdot nH_2O \, (n=\text{from } 1.4 \text{ through } 3) \quad (4)$$

The chemical changes of (1) and (2) tend to occur when the temperature of water or water vapor is 80° C. or higher, and boehmite (monohydrated aluminum oxide) is produced through the chemical reaction of (2). 2AlO(OH) produced through (1) may also exist. The chemical change of (3) tends to occur when the temperature of water or water vapor is lower than 80° C., and bayerite (trihydrated aluminum oxide) is produced through the chemical reaction of (3). Pseudo boehmite (n-hydrated aluminum oxide) is produced through the chemical reaction of (4). Hence, at least part of the aluminum oxide contained in the aluminum oxide film 112X changes to hydrous alumina through the hydration step. The hydrous alumina (2), (3), and (4) produced through the hydration is considered to contain $Al_2O_3 \cdot nH_2O$ ($1 \leq n \leq 3$). The hydrous alumina (1), (2), (3), and (4) produced through the hydration is considered to contain $Al_2O_3 \cdot nH_2O$ ($0 < n \leq 3$).

On the other hand, the aluminum oxide film 112X formed on the second surface 110B is less affected by the hydration because it is covered with the third film 113 having a thickness of 80 nm or greater and 135 nm or less. Through the hydration of the intermediate structure 114, the aluminum oxide films 112X are allowed to be the first film 111 positioned on the first surface 110A and containing hydrous alumina, and to be the second film 112 positioned on the second surface 110B and containing the aluminum oxide having a crystallinity lower than that of α-alumina.

In this way, the light transmissive member 100 illustrated in FIG. 1 can be produced.

The light transmissive member 100 according to the present embodiment has different films on the first surface 110A and the second surface 110B of the base member 110. The first film 111 containing hydrous alumina is brittle. Hence, conveying the light transmissive member 100 by making a jig such as a suction nozzle or the like in contact with the first film 111 may damage the first film 111. In the embodiment of the present disclosure, the third film 113 having a hardness higher than that of the first film 111 containing the hydrous alumina is positioned on the second surface 110B side, such that a jig such as a suction nozzle or the like is made to be in contact with the third film 113 to convey the light transmissive member 100. Hence, it is possible to suppress damaging of the first film 111. Moreover, the third film 113 having a hardness higher than the hardness of the second film 112 can also suppress occurrence of damage on the second film 112. In the present embodiment, the coefficients of thermal expansion of the base member 110, the second film 112, and the third film 113 descend in the order of the base member 110, the second film 112, and the third film 113. For example, the base member 110 contains a polycarbonate resin, the second film 112 contains the aluminum oxide, and the third film contains silicon oxide. By making the coefficients of thermal expansion of the films formed on the second surface 110B of the base member 110 smaller as they are farther from the base member 110, it is possible to suppress the films from being detached from the base member 110. Moreover, by positioning the second film 112 and the third film 113 in this order on the second surface 110B of the base member 110 such that the refractive indices of the films gradually decrease and these films in contact with each other, it is possible to make these films close to a light reflection-reduced optical design.

Second Embodiment

Next, a second embodiment will be described. The second embodiment relates to a light source device.

Structure of the Light Source Device According to the Second Embodiment

Figure 4:
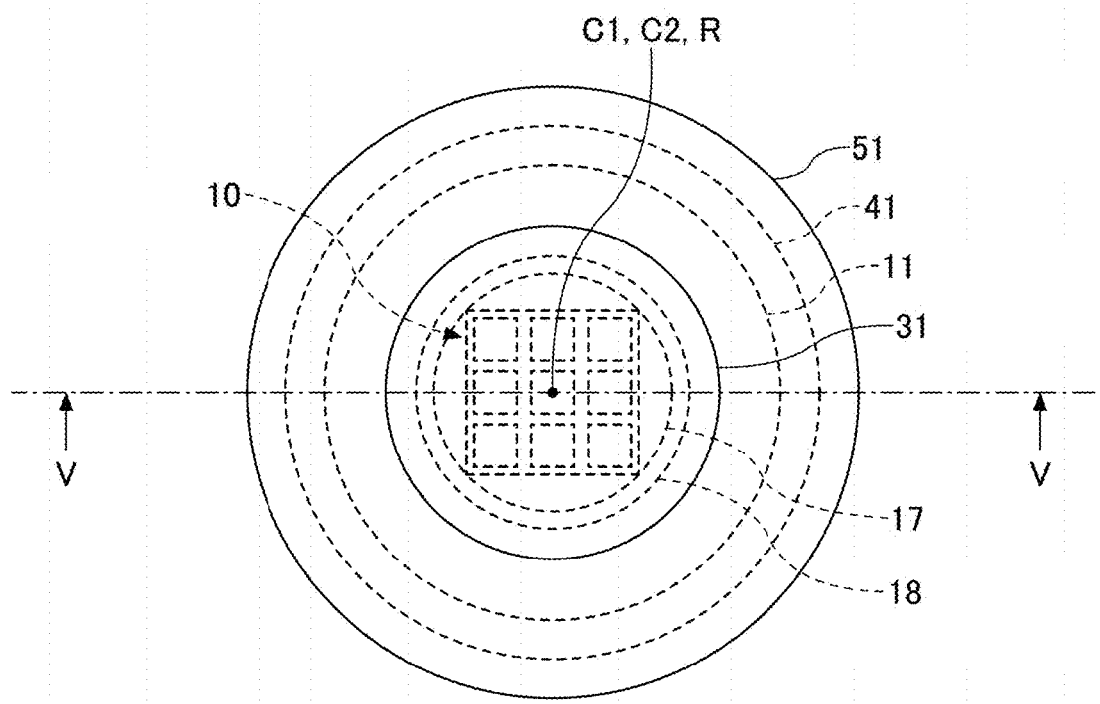
FIG. 4 is a top view illustrating a light source device according to a second embodiment.
Figure 5:
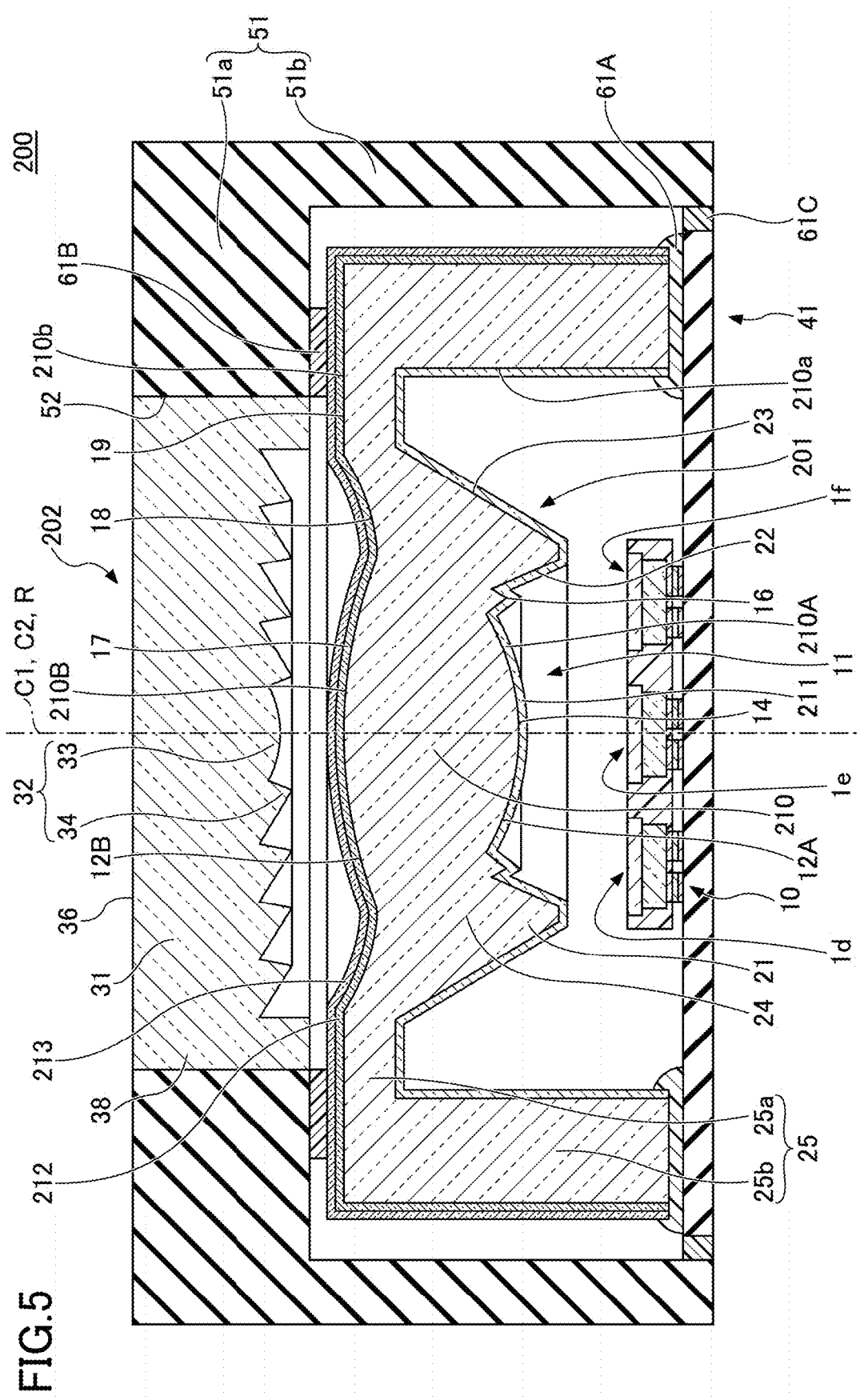
FIG. 5 is a cross-sectional view illustrating the light source device according to the second embodiment.
Figure 6:
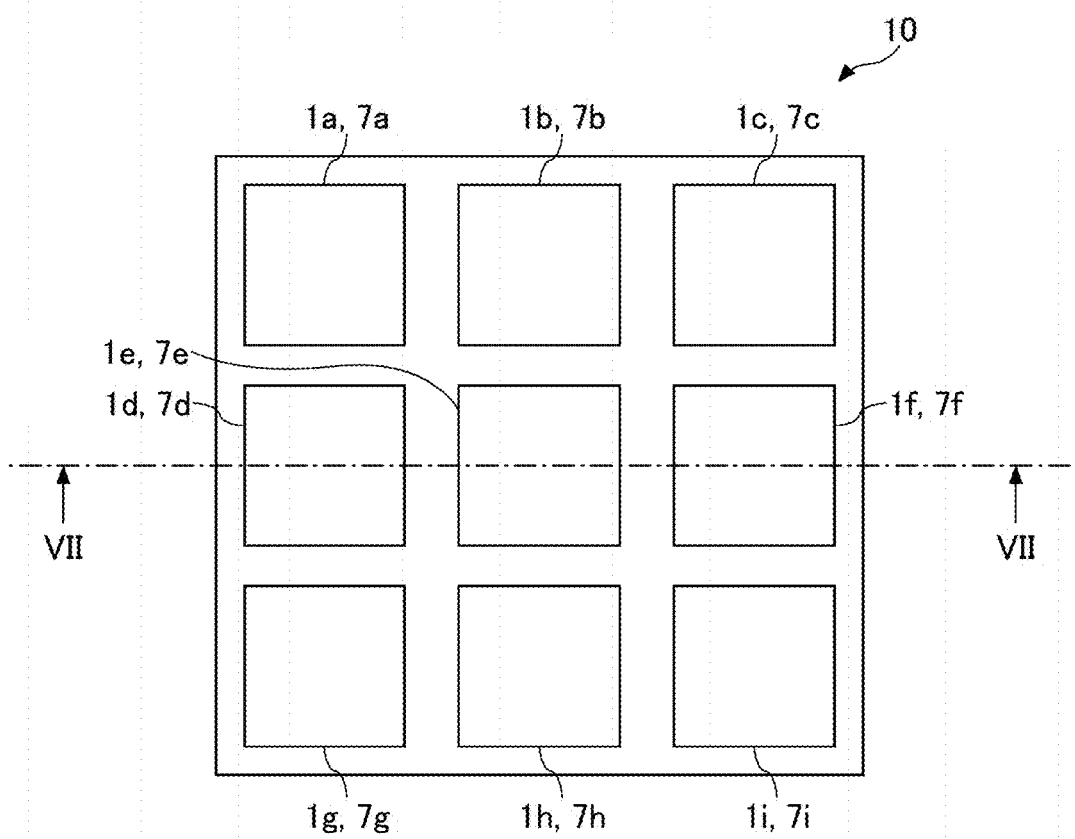
FIG. 6 is a view illustrating an example arrangement of light emitting part in the light source device according to the second embodiment.

First, the structure of the light source device according to the second embodiment will be described. FIG. 4 is a top view illustrating the light source device according to the second embodiment. FIG. 5 is a cross-sectional view illustrating the light source device according to the second embodiment. FIG. 6 is a view illustrating an example arrangement of light emitting part in the light source device according to the second embodiment. A first light transmissive member of the light source device according to the second embodiment is different from the first embodiment in that a base member thereof includes a first lens. For example, the light source device 200 is a flash light source device mounted on a smartphone for an image capturing device provided on the smartphone. Examples of the image capturing device include a camera configured to capture a still image, and a video camera configured to capture a moving image.

As illustrated in FIG. 4 to FIG. 6, the light source device 200 according to the second embodiment includes: a light source 10 including light emitting parts 1; and a first light transmissive member 201. The first light transmissive member 201 includes a base member 210 including: a first lens 11; and a first support 25. The first support 25 is provided around the first lens 11, and supports the first lens 11. The first lens 11 has a first surface 210A, and a second surface 210B positioned on a side opposite to the first surface 210A. In the present embodiment, the first surface 210A and the second surface 210B of the first lens 11 each include a convex surface. The first lens 11 may include a biconvex lens. In the present embodiment, the light emitting parts 1 include a plurality of light emitting parts 1a to 1i, and the first surface 210A is positioned to face the light emitting parts 1a to 1i. In the following description, the light emitting parts 1a to 1i may be collectively referred to as the light emitting parts 1. The first lens 11 includes a light incident part 12A and a light exiting part 12B. The light incident part 12A is positioned in the first surface 210A of the first lens 11. Light from the light emitting parts 1 enters the light incident part 12A. The light exiting part 12B is positioned in the second surface 210B of the first lens 11. Light transmitted through the first lens 11 exits the light exiting part 12B. The first lens 11 may further include a light guide part 21 provided to fully surround the light incident part 12A. The light guide part 21 is configured to guide light that has entered from the light incident part 12A.

The light source device 200 may further include a substrate 41, a second light transmissive member 202, and a third support 51. The second light transmissive member 202 includes a second lens 31 and a second support 38. The light emitting parts 1 are mounted on the substrate 41. The third support 51 is provided around the first light transmissive member 201 and the second light transmissive member 202. The second light transmissive member 202 is supported to be above the first light transmissive member 201 by the third support 51, so as to overlap with the first light transmissive member 201 in a top view. For example, the first support 25 is fixed to the substrate 41 via an adhesive member 61A. The third support 51 is fixed to the first light transmissive member 201 via an adhesive member 61B, and is fixed to the substrate 41 via an adhesive member 61C. The third support 51 has a circular opening portion 52 overlapping with the first lens 11 of the first light transmissive member 201 in a top view, and the second light transmissive member 202 is provided in the opening portion 52 and fixed to the third support 51.

As illustrated in FIG. 6, the light emitting parts 1a to 1i are arranged in a square grid formation of three rows and three columns. In the present embodiment, the light emitting parts 1a to 1i are arranged at equal intervals in both vertical and lateral directions, but the arrangement of the light emitting parts 1 is not limited to this. The quantity of the light emitting parts is not limited to nine, and at least one or more will do. In a case where the quantity of the light emitting parts 1 is plural, they may be arranged in a square grid or rectangle grid formation of one or more rows and two or more columns. Moreover, in a case where the quantity of the light emitting parts 1 is plural, the light emitting parts 1 may be controlled to emit light individually or on a group-by-group basis.

In the light source device 200, the first lens 11 has a light axis C1. In the present embodiment, the light axis C1 of the first lens 11 is at a position overlapping with the light emitting part 1e positioned in the center among the light emitting parts 1a to 1i in a top view. That is, the light source device 200 includes the light emitting parts 1, and the first light transmissive member 201 positioned in a path of light emitted from the light emitting parts 1. In the light source device 200, the second lens 31 has a light axis C2. In the present embodiment, the light axis C2 of the second lens 31 is at a position overlapping with the light emitting part 1e positioned in the center among the light emitting parts 1a to 1i in a top view. It is preferable that the light axis C1 of the first lens 11 and the light axis C2 of the second lens 31 approximately coincide with each other. In the example illustrated in FIG. 5, the light axis C1 of the first lens 11, the light axis C2 of the second lens 31, and the center R of the light emitting part 1e overlap with each other in a top view.

(First Light Transmissive Member 201)

Next, a specific configuration of the first light transmissive member 201 will be described.

In the present embodiment, the first light transmissive member 201 includes the light transmissive base member 210. The light transmissive base member 210 includes the first lens 11 and the first support 25. The base member 210 is formed of, for example, a light transmissive resin such as a polycarbonate resin, an acrylic resin, a silicone resin, an epoxy resin, or the like. The first lens 11 is disposed above the light emitting parts 1 such that the first surface 210A of the first lens 11 faces light emitting surfaces 7. The first lens 11 is configured to condense light from the light emitting parts 1 and output the light to the second lens 31 side. An example of the first lens 11 is a collimator lens. The shape of the first lens 11 is preferably a circle or an ellipse in a top view, and may be a polygon such as a tetragon or a hexagon. In the present embodiment, the first light transmissive member 201 is formed to include the first lens 11, a light transmissive first film 211 covering the first surface 210A of the first lens 11, a light transmissive second film 212 covering the second surface 210B of the first lens 11, and a light transmissive third film 213 provided on the second film 212. In the example illustrated in FIG. 5, the light transmissive first film 211 also covers a first surface 210a of the first support 25. The light transmissive second film 212 and the light transmissive third film 213 cover a second surface 210b of the first support 25. The term "light transmissive" here means that the object has transmittance of 60% or higher with respect to the incident light.

The first lens 11 includes the light incident part 12A and the light guide part 21. The light incident part 12A is disposed on the first surface 210A facing the light emitting parts 1. The light incident part 12A is positioned in the center of the first lens 11, and the light from the light emitting parts 1a to 1i enters into the light incident part 12A. The light guide part 21 is an annular shape positioned outward of the incident part 12A, and configured to guide the light that has entered from the light incident part 12A. In the present embodiment, an annular shape includes not only a ring-like round shape, but also any closed shape that has no parts thereof crossing each other. The shape of the lower surface of the first lens 11 may be a rotationally symmetrical shape. In a case of using the light source device 200 as a flash light source of a smartphone or the like, the shape of the lower surface of the first lens 11 may be a 4-fold rotationally symmetrical shape or a 2-fold rotationally symmetrical shape in a top view, taking into consideration that ordinary cameras have a rectangular image capturing range.

The light incident part 12A is a concave part that is formed on the lower surface of the first lens 11, and that is formed in a size that can accommodate the light emitting parts 1 thereinside when seen in a top view. In the present embodiment, the shape of the bottom surface of the concave part in a top view is a circle, but may be an ellipse, a triangle, a quadrangle, a hexagon, or the like. It is preferable that the bottom surface of the concave part has a Fresnel lens-like shape. That is, it is preferable that the light incident part 12A has a lower convex surface 14 positioned in the center and a convex part 16 positioned in an annular shape on the periphery of the lower convex surface 14. The lower convex surface 14 is convex toward the light emitting parts 1 side. The convex part 16 protrudes to the light emitting parts 1 side. Moreover, it is preferable that the convex part 16 is in an annular shape positioned on the periphery of the lower convex surface 14 continuously or discretely. The convex part 16 is formed in a single-lap annular shape here, but may be formed in multiple laps. Providing the convex part 16 can reduce the radius of the lower convex surface 14 and can provide a better entrance for the light from the light emitting parts 1, resulting in an improved light condensation. An inner surface 22 of the concave part is preferably a flat surface, but may be a curved surface.

The light guide part 21 is positioned on the lower surface side of the first lens 11 and on the outer side of the light incident part 12A in a top view. The light guide part 21 has an inclined surface 23 that reflects light that has been incident to the light incident part 12A. It is preferable that the light guide part 21 is formed in an annular shape on the periphery of the light incident part 12A continuously or discretely. Hence, the light guide part 21 can condense portions of light that have been emitted at a large angle to travel outside a desired irradiation range, among portions of light emitted from the light emitting parts 1, making it possible to improve the light extraction efficiency. The inclination angle of the inclined surface 23 with respect to the light axis C1 of the first lens 11 is appropriately set to an angle at which light from the light emitting parts can be incident and can be reflected. It is preferable that the inclination angle of the inclined surface 23 with respect to the light axis C1 of the first lens 11 is an angle at which the light from the light emitting parts 1 is totally reflected. The first surface 210A of the first lens 11 may include a total reflection surface.

The upper surface of the first light transmissive member 201 has, for example, the second surface 210B of the first lens 11, and a flat part 19 that surrounds the entire periphery of the second surface 210B of the first lens 11. The second surface 210B of the first lens 11 includes an upper convex surface 17 and an upper concave surface 18. The upper convex surface 17 is positioned in the center of the second surface 210B, and has a shape that is convex toward the second lens 31 side. The upper concave surface 18 is in an annular shape to surround the entire periphery of the upper convex surface 17, and is continuous to the upper convex surface 17. The flat part 19 is positioned to surround the entire periphery of the upper concave surface 18, and is continuous to the upper concave surface 18. For example, the upper concave surface 18 is positioned outward of the lower convex surface 14 in a top view. Providing the upper convex surface 17 in the first lens 11 can make it easy for light that has entered from either or both of the lower convex surface 14 and the convex part 16 of the light incident part 12A to be extracted to the second lens side. Providing the upper concave surface 18 in the first lens 11 can make it easy for light that has been reflected on the inclined surface 23 to be extracted to the second lens side. Moreover, providing the upper concave surface 18 enables the inclined surface 23 to have a smaller inclination angle with respect to the light axis C1 of the first lens 11. This makes it possible to reduce the lens diameter of the first lens 11, and to also reduce the lens diameter of the second lens 31. Moreover, this also makes it possible to reduce the diameter of the opening portion 52 in the third support 51 described below. This makes it difficult for the interior of the opening portion 52 to be seen, and can improve the visual quality of the appearance. The lower surface of the base member 210 is an example of the first surface, and the upper surface of the base member 210 is an example of the second surface.

The first support 25 extends sideways from the outer periphery of the first lens 11. The first support 25 includes a first upper part 25a and a first leg 25b. The first upper part 25a extends sideways from the outer periphery of the first lens 11. The first leg 25b extends from the first upper part 25a to the substrate 41 side. The first support 25 is formed in an annular shape to extend sideways from the outer periphery of the first lens 11 and surround the first lens 11. The first upper part 25a is formed to have a flat top, and is formed to be approximately on the same height as the top end of the upper convex surface 17 of the first lens 11. For example, the first leg 25b is formed in a tubular shape that is continuous to the side of the first upper part 25a. For example, the first lens 11 and the first support 25 are integrally formed of the same material. The first lens 11 and the first support 25 may be formed of different materials. For example, the first lens 11 may be formed of a resin or a glass material through which light can be transmitted, and the first support 25 may be formed of a metal such as an aluminum alloy or the like.

The lower surface of the first leg 25b of the first support 25 and the upper surface of the substrate 41 are bonded with each other via the adhesive member 61A. That is, the base member 210 is fixed on the substrate 41. As the adhesive member 61A, an adhesive material such as a resin, an adhesive tape, or the like may be used.

The first film 211 covers the light incident part 12A and the inclined surface 23 of the first lens 11. In the present embodiment, the first film 211 covers the lower convex surface 14, the convex part 16, the concave part's inner surface 22, and the inclined surface 23 of the first lens 11. That is, the first film 211 covers the first surface 210A of the base member 210 serving as a light incident surface. It is preferable that the first film 211, the light axis C1 of the first lens 11, and the light emitting surfaces of the light emitting parts 1 overlap with each other in a top view. In the present embodiment, in a top view, the light axis C1 of the first lens 11 is at a position overlapping with the light emitting part 1e, and the light axis C1 of the first lens 11 coincides with the light emitting surface 7e. For example, in a case of using the light emitted from the light emitting part 1e of the light source device 200 as a flash light for telephotographing, the first film 211 can reduce light to be reflected back on the light incident part 12A of the first lens 11, and the photo subject can be illuminated with a narrow light distribution at a high illuminance. The second film 212 covers the light exiting part 12B of the first lens 11. In the present embodiment, the second film 212 covers the upper convex surface 17. That is, the second film 212 covers the second surface 210B of the base member 210 serving as a light exiting surface. The second film 212 may further cover the upper concave surface 18 of the first lens 11. The third film 213 is formed above the second film 212. For example, the first film 211 is in contact with the light incident part 12A, the second film 212 is in contact with the upper convex surface 17, and the third film 213 covers the upper convex surface 17 from above the second film 212.

(Second Light Transmissive Member)

Next, a specific configuration of the second light transmissive member 202 will be described.

The second light transmissive member 202 includes the second lens 31 and the second support 38. With the lower surface of the second lens 31 positioned to face the second surface 210B of the first lens 11, the second lens 31 is configured to refract the light exiting the first lens 11 through the light exiting part 12B and direct it to within a desired irradiation range. Like the first light transmissive member 201, the second light transmissive member 202 is formed of a light transmissive resin such as a polycarbonate resin, an acrylic resin, a silicone resin, an epoxy resin, or the like. The contour shape of the second light transmissive member 202 in a top view is preferably a circle or an ellipse, yet may be a polygon such as a tetragon, a hexagon, or the like.

The second lens 31 has a plurality of annular convex parts 34 facing the second surface 210B of the first lens 11. The plurality of annular convex parts 34 may be Fresnel-shaped. A lens surface 32 has a center convex part 33, and the plurality of annular convex parts 34. The center convex part 33 has a shape that is convex toward the first lens 11 side. The plurality of convex parts 34 are concentrically positioned outward of the center convex part 33 centering on the light axis C2 of the second lens 31, and have shapes that are convex toward the first lens 11 side. It is preferable that the plurality of annular convex parts 34 are arranged concentrically with respect to the center convex part 33 in a top view, and have annular shapes conforming to the shape of the center convex part 33. That is, in a preferable case where the center convex part 33 has a circular shape in a top view, the convex parts 34 have annular shapes in a top view, whereas in a case where the center convex part 33 has a rectangle shape in a top view, the convex parts 34 have rectangular annular shapes in a top view. It is preferable that the lens surface 32 is formed in a size that can accommodate the light incident part 12A and the light guide part 21 of the first lens 11 thereinside when seen in a top view. The lower surface of the second lens 31 may have a Fresnel lens surface.

The top surface of the second light transmissive member 202 is a flat surface 36. The flat surface 36 is formed in a size that is equal to or larger than the lens surface 32 in a top view. The flat surface 36 is formed to be at the same height as the upper surface of the third support 51 when the second light transmissive member 202 is inserted in the opening portion 52 in the third support 51. The flat surface 36 may be processed to be embossed or to have minute protrusions and recessions.

The second support 38 is formed in an annular shape to extend sideways from the outer periphery of the second lens 31, and the upper surface thereof is formed to be coplanar with the flat surface 36. The lower end surface of the second support 38 is positioned at the lower side of the lower surface of the lens surface 32. The second support 38 of the second light transmissive member 202 is formed to be more centerward than the first leg 25b of the first lens 11. As the lower end surface of the second support 38 is positioned at the lower than the lens surface 32, the first lens 11 and the second lens 31 are spaced apart from each other. This can suppress interference between the first lens 11 and the second lens 31.

<Light Emitting Parts>

Figure 7:
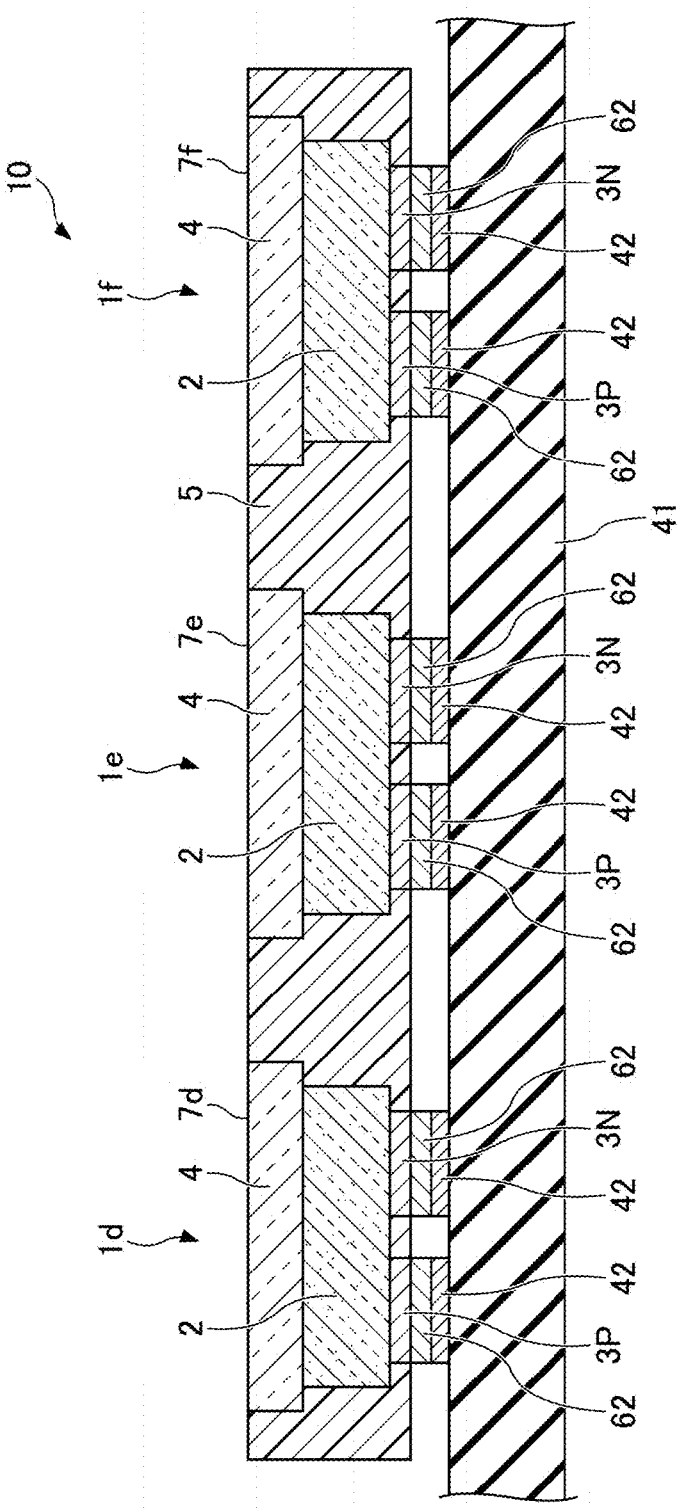
FIG. 7 is a cross-sectional view of FIG. 6 along a line VII-VII.

Next, a specific configuration of the light emitting parts 1 will be described. FIG. 7 is a cross-sectional view illustrating the light emitting parts. FIG. 7 is a cross-sectional view of FIG. 6 along a line VII-VII.

The light emitting parts 1a to 1i respectively have the light emitting surfaces 7a to 7i on their upper surface. In the following description, the light emitting surfaces 7a to 7i may be collectively referred to as the light emitting surfaces 7. The light emitting parts 1 are mounted on the substrate 41, with their lower surface opposite to the upper surface serving as the mounting surface. Each light emitting part 1 includes a light emitting element 2, a wavelength conversion member 4, and a cover member 5. The wavelength conversion member 4 is provided on the upper surface of the light emitting element 2. The cover member 5 covers the lateral surfaces of the light emitting element 2 and the lateral surfaces of the wavelength conversion member 4. The upper surface of the wavelength conversion member 4 is exposed from the cover member 5. The upper surface of the wavelength conversion member 4 is the light emitting surface 7 (i.e., the main light extraction surface). The lateral surfaces of the wavelength conversion member 4 may be exposed from the cover member 5. The shape (planar shape) of the light emitting part 1 in a top view is, for example, a quadrangle. The planar shape of the light emitting part 1 may be a circle or an ellipse, or may be a polygon such as a triangle, a hexagon, or the like. The light emitting parts 1a to 1i may have the same configuration, or may be different in at least one component. The light emitting parts 1a to 1i may be linked to each other by being integrally formed via the cover member 5.

The light emitting element 2 has at least one pair of positive and negative element electrodes on the lower surface thereof. In the present embodiment, a positive electrode 3P and a negative electrode 3N are provided. The light emitting element 2 is placed over the substrate 41, and electrodes 42 of the substrate 41 are electrically connected to the element electrodes of the light emitting element 2. The light emitting element 2 is, for example, a semiconductor element, and contains such a semiconductor as a Group III-V compound semiconductor, a Group II-VI compound semiconductor, or the like. Examples of compound semiconductors include nitride-based semiconductors such as $In_XAl_YGa_{1-X-Y}N$ ($0 \leq X$, $0 \leq Y$, $X+Y \leq 1$). Specific examples of compound semiconductors include InN, AlN, GaN, InGaN, AlGaN, and InGaAlN. The light emitting element 2 is, for example, a Light Emitting Diode (LED) or a Laser Diode (LD). The light emission peak wavelength of the light emitting element 2 is preferably 400 nm or longer and 530 nm or shorter, more preferably 420 nm or longer and 490 nm or shorter, and more preferably 440 nm or longer and 475 nm or shorter in terms of light emission efficiency, and excitation and the like of a phosphor described below.

The wavelength conversion member 4 is a plate-shaped member having an approximately rectangular shape as a top-view shape, and covers the upper surface of the light emitting element 2. The wavelength conversion member 4 contains a phosphor that converts the wavelength of at least a part of light from the light emitting element 2. The wavelength conversion member 4 may be formed of a light transmissive resin material, or an inorganic material such as ceramics, glass, or the like. As the resin material, a thermosetting resin such as a silicone resin, a modified silicone resin, an epoxy resin, a phenol resin, or the like may be used. Moreover, a thermoplastic resin such as a polycarbonate resin, an acrylic resin, a methyl pentene resin, a polynorbornene resin, or the like may be used. Particularly, a silicone resin or a modified resins thereof good in light resistance and heat resistance is preferable. The term "light transmissive" here means that the object has transmittance of 60% or higher with respect to the incident light. Moreover, the wavelength conversion member 4 may contain a light diffusing substance. Examples of the wavelength conversion member 4 include: a phosphor that is contained in the resin material listed above, ceramic, glass or the like; a sintered body of the phosphor; or the like.

As the phosphor contained in the wavelength conversion member 4, the following may be used: a yttrium-aluminum-garnet-based phosphor (e.g., $(Y,Gd)_3(Al,Ga)_5O_{12}:Ce$), a lutetium-aluminum-garnet-based phosphor (e.g., $Lu_3(Al, Ga)_5O_{12}:Ce$), a terbium-aluminum-garnet-based phosphor (e.g., $Tb_3(Al,Ga)_5O_{12}:Ce$), a CCA-based phosphor (e.g., $Ca_{10}(PO_4)_6C_{12}:Eu$), a SAE-based phosphor (e.g., $Sr_4Al_{14}O_{25}:Eu$), a chlorosilicate-based phosphor (e.g., $Ca_8MgSi_4O_{16}C_{12}:Eu$), a silicate-based phosphor (e.g., $(Ba, Sr,Ca,Mg)_2SiO_4:Eu$), oxynitride-based phosphors such as a β-sialon-based phosphor (e.g., $(Si,Al)_3(O,N)_4:Eu$) or an β-sialon-based phosphor (e.g., $Ca(Si,Al)_{12}(O,N)_{16}:Eu$), a LSN-based phosphor (e.g., $(La,Y)_3Si_6(N_{11}:Ce)$, a BSESN-based phosphor (e.g., $(Ba,Sr)_2Si_5N_8:Eu$), a SLA-based phosphor (e.g., $SrLiAl_3N_4:Eu$), nitride-based phosphors such as a CASN-based phosphor (e.g., $CaAlSiN_3:Eu$) or a SCASN-based phosphor (e.g., $(Sr,Ca) AlSiN_3:Eu$), fluoride-based phosphors such as a KSF-based phosphor (e.g., $K_2SiF_6: Mn$), a KSAF-based phosphor (e.g., $K_2(Si_{1-x}Al_x)F_{6-x}: Mn$ (here, x satisfies $0<x<1$)) or a MGF-based phosphor (e.g., $3.5MgO \cdot 0.5MgF_2 \cdot GeO_2: Mn$), a quantum dot having a perovskite structure (e.g., (Cs, FA,MA) (Pb, Sn) (F,Cl,Br,I)$_3$ (here, FA and MA represent formamidinium and methyl ammonium, respectively)), a Group II-VI quantum dot (e.g., CdSe), a Group III-V quantum dot (e.g., InP), a quantum dot having a chalcopyrite structure (e.g., (Ag,Cu) (In,Ga) (S,Se)$_2$), or the like. The phosphor is particulate. One of these phosphors may be used alone, or two or more of these phosphors may be used in combination.

For example, in a case where a blue light emitting element is used as the light emitting element 2, a light emitting part 1 that is configured to emit white light can be obtained, provided that the wavelength conversion member 4 contains a yellow phosphor. The wavelength conversion member 4 may contain a light diffusing substance. As the light diffusing substance, for example, titanium oxide, barium titanate, aluminum oxide, silicon oxide, or the like may be used.

The cover member 5 directly or indirectly covers the lateral surfaces of the light emitting elements 2 and the wavelength conversion members 4. It is preferable that the cover member 5 is formed of a member having a high light reflectance, in order to improve the light extraction efficiency. As the cover member 5, for example, a resin material containing a light reflecting substance such as a white pigment or the like may be used. Examples of the light reflecting substance include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, silicon oxide, or the like. These may be used alone or in combination of two or more. As the resin material, a resin material mainly formed of a thermosetting resin such as an epoxy resin, a silicone resin, a modified silicone resin, a phenol resin, or the like is preferable as a matrix. As needed, the cover member 5 may be formed of a member having a visible light transmissivity.

(Substrate)

Next, a specific configuration of the substrate 41 will be described below. The light emitting parts 1 are mounted on the substrate 41. As illustrated in FIG. 7, the substrate 41 has the electrodes 42 on the surface. The substrate 41 may also include an electrode 42 inside thereof. Electric connection between the substrate 41 and the light emitting parts 1 is obtained by connecting the electrodes 42 with the electrodes 3P and 3N of the light emitting parts 1 via a conductive adhesive member 62.

The substrate 41 contains an insulating material. As the insulating material, it is preferable to use a material through which light emitted from the light emitting parts 1 and external light are hardly transmitted, and it is preferable to use a material having a certain strength. Specifically, the substrate 41 may be formed of a ceramic such as alumina, aluminum nitride, mullite, or the like, and resins such as phenol resins, epoxy resins, polyimide resins, Bismaleimide Triazine resins (BT resins), polyphthalamide, or the like.

The electrode 42 may be formed of copper, iron, nickel, tungsten, chromium, aluminum, silver, gold, titanium, palladium, or rhodium, or any alloy of these, or the like. A layer of silver, platinum, aluminum, rhodium, or gold, or any alloy of these, or the like may be formed as the surface layer of the electrode 42 in terms of the wettability of the conductive adhesive member 62, light reflectivity, and the like.

(Third Support)

Next, a specific configuration of the third support 51 will be described. The third support 51 covers the first lens 11 from the sides. The third support 51 includes a second upper part 51a and a second leg 51b. The second upper part 51a is formed in an annular shape and has the opening portion 52. The lateral surface of the opening portion 52 and the lateral surface of the second support 38 of the second light transmissive member 202 are joined with each other. The second lens 31 and the second support 38 may be joined with each other as a two-color molding, or may be joined via an adhesive member between the second lens 31 and the second support 38. The lower surface of the second upper part 51a and the upper surface of the first upper part 25a of the first support 25 are joined with each other via the adhesive member 61B. The second leg 51b extends downward from the second upper part 51a. The lateral surface of the second leg 51b and the lateral surface of the substrate 41 are joined with each other via the adhesive member 61C. As the adhesive members 61B and 61C, adhesive materials such as a resin, an adhesive tape, or the like may be used. It is preferable that the third support 51 is formed of a light-shielding member, and is formed of, for example, a resin material containing a filler such as a light reflecting member, a light absorbing member, or the like, in order that the directions of distribution of the light exiting the light source device 200 can be limited. Examples of the shape of the opening portion 52 in a top view include a circle, an ellipse, a triangle, a quadrangle, a hexagon, or the like.

Method of Producing the Light Source Device According to the Second Embodiment

Figure 8:
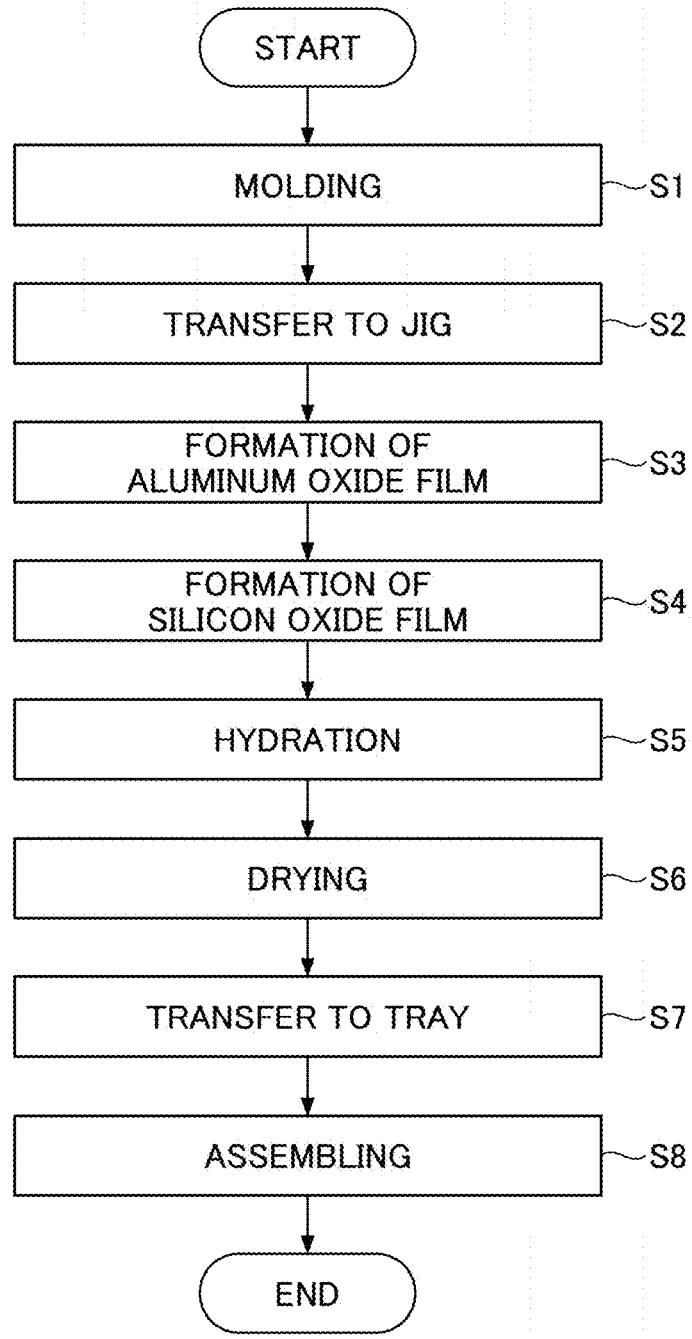
FIG. 8 is a flowchart illustrating a method of producing the light source device according to the second embodiment.
Figure 9:
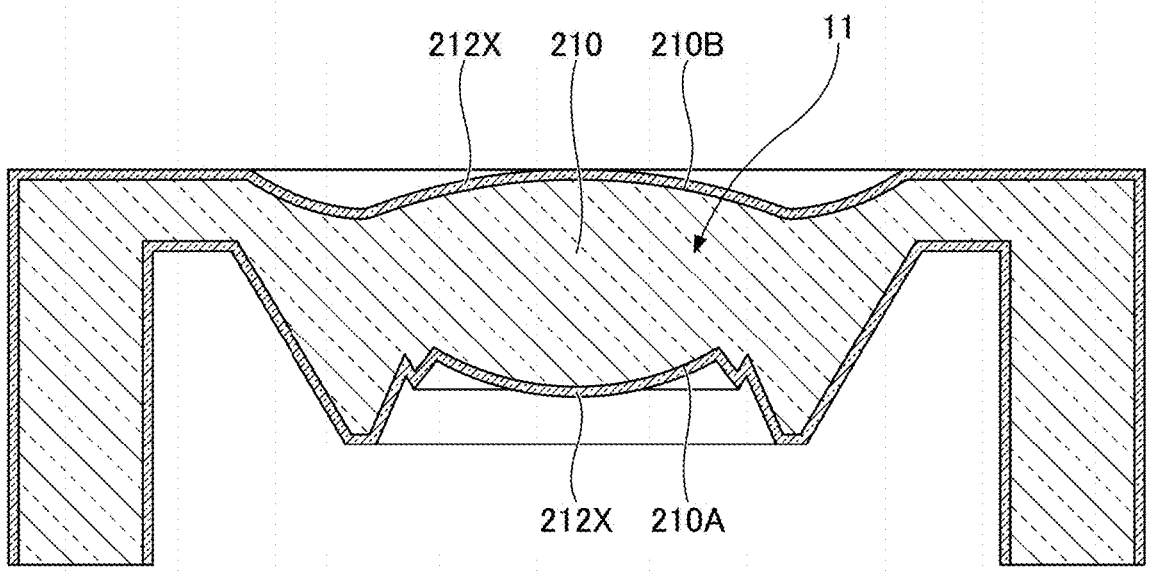
FIG. 9 is a cross-sectional view illustrating the method of producing the light source device according to the second embodiment.
Figure 10:
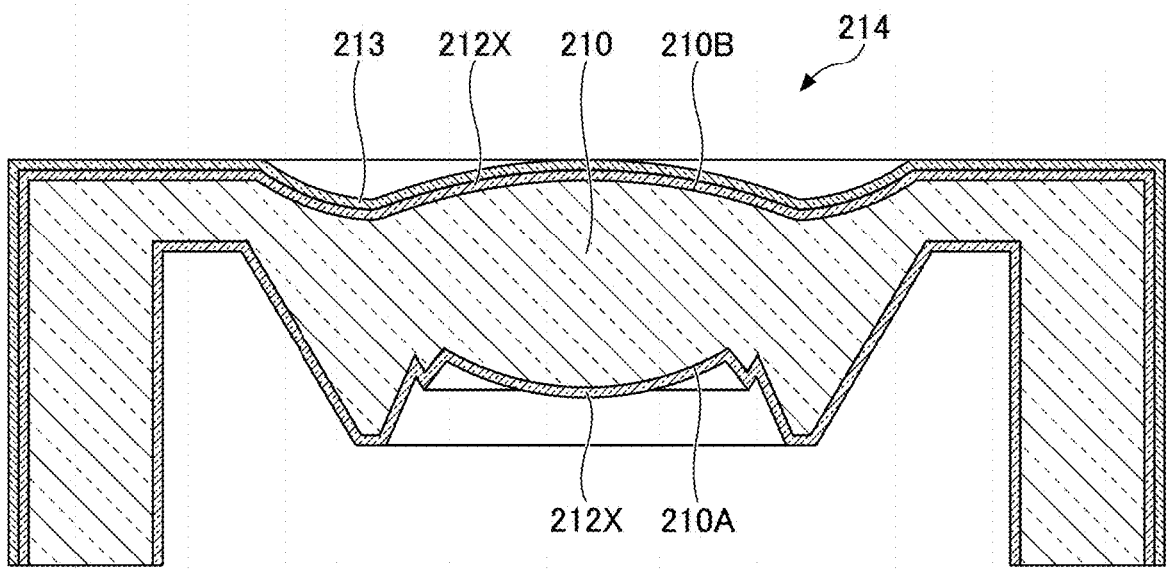
FIG. 10 is a cross-sectional view illustrating the method of producing the light source device according to the second embodiment.
Figure 11:
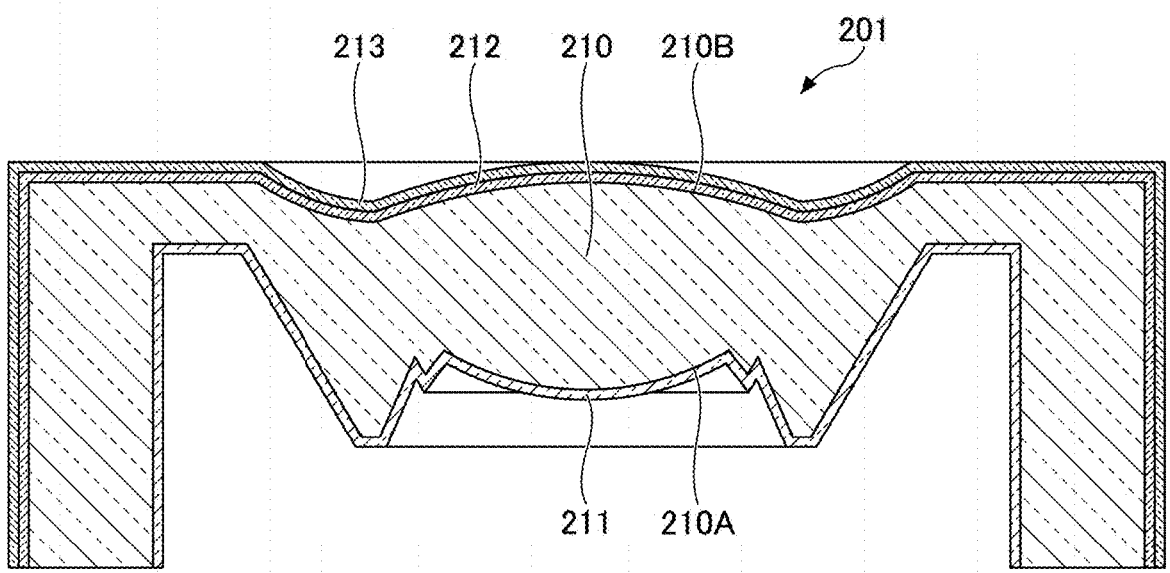
FIG. 11 is a cross-sectional view illustrating the method of producing the light source device according to the second embodiment.

Next, a method of producing the light source device 200 according to the second embodiment will be described. FIG. 8 is a flowchart illustrating the method of producing the light source device 200 according to the second embodiment. FIG. 9 to FIG. 11 are cross-sectional views illustrating the method of producing the light source device 200 according to the second embodiment.

A step of providing the light transmissive base member 210 having the first surface 210A (the lower surface in FIG. 9) and the second surface 210B (the upper surface in FIG. 9) as illustrated in FIG. 9 is performed. In the present embodiment, the base member 210 includes the first lens 11. It is possible to obtain the first lens 11 by, for example, molding a raw material (step S1). Subsequently, a step of transferring the base material 210 onto a jig is performed (step S2). A plurality of base members 210 may be transferred onto the jig.

Subsequently, a step of forming a light transmissive aluminum oxide film 212X is performed by the ALD method (step S3), the light transmissive aluminum oxide film 212X containing aluminum oxide having a crystallinity lower than that of α-alumina so as to cover the first surface 210A and the second surface 210B of the base member 210. The aluminum oxide film 212X may be formed by the same method as that for forming the aluminum oxide film 112X in the first embodiment.

Subsequently, a step of forming a silicon oxide film by a sputtering method as the light transmissive third film 213 on the aluminum oxide film 212X on the second surface 210B as illustrated in FIG. 10, to obtain an intermediate structure 214, is performed (step S4). The intermediate structure 214 includes the base member 210, the aluminum oxide film 212X formed on the first surface 210A of the base member 210, and the aluminum oxide film 212X and the third film 213 formed on the second surface 210B of the base member 210. The third film 213 may be formed by the same method as that for forming the third film 113 in the first embodiment.

Subsequently, a step of hydrating the intermediate structure 214 is performed (step S5). In this step, the intermediate structure 214 is hydrated such that the aluminum oxide film 212X becomes the first film 211 positioned on the first surface 210A and containing hydrous alumina, and becomes the second film 212 positioned on the second surface 210B and containing the aluminum oxide having a crystallinity lower than that of α-alumina as illustrated in FIG. 11. The hydration may be performed by the same method as the hydration in the first embodiment.

Subsequently, a step of drying the intermediate structure 214 after being hydrated is performed (step S6). As a result, the first light transmissive member 201 including the first lens 11 can be provided. The first light transmissive member 201 after being dried is transferred from the jig onto a tray (step S7). In the step S7, the first light transmissive member 201 is conveyed by a jig such as a suction nozzle or the like being brought into contact to the third film 213 in a step of positioning the first light transmissive member 201.

The present embodiment further includes a step of positioning the second light transmissive member 202 above the first light transmissive member 201. For example, the light emitting parts 1, the substrate 41 on which the light emitting parts 1 are to be mounted, and the second light transmissive member 202 supported by the third support 51 are provided, and they are assembled with the first light transmissive member 201 including the first lens 11 (step S8). In the step S8, the second light transmissive member 202 is positioned above the first lens 11 via the adhesive member 61B such that the lower surface, e.g., the lens surface 32 of the second lens 31 including the plurality of annular convex parts faces the second surface 210B of the first lens 11. As a result, the second light transmissive member 202 has the plurality of annular convex parts on its surface facing the first light transmissive member 201. Then, the light emitting parts 1 are mounted on the substrate 41, and the first light transmissive member 201 is fixed on the substrate 41 such that the first light transmissive member 201 is positioned on the path of light emitted from the light emitting parts 1. The first light transmissive member 201 is positioned such that the light emitted from the light emitting parts 1 enters into the first lens 11 through the first surface 210A of the first lens 11 and exits through the second surface 210B.

In this way, the light source device 200 according to the second embodiment can be produced.

In the second embodiment, of the first lens 11, the first film 211 of containing the hydrous alumina covers the lower surface of the base member 210 facing the light emitting parts 1a to 1i. Because the hydrous alumina has minute protrusions and recessions, it can reduce reflection on the lower surface and improve the illuminance of the light source device 200. The second film 212 covers the upper surface of the base member 210, the third film 213 is formed above the second film 212, and the hardness of the third film 213 is higher than the hardness of the second film 212. Hence, during assembling of the light source device 200, it is possible to reduce occurrence of damage on the first film 211 and the second film 212 by transferring the first light transmissive member 201 including the first lens 11 by bringing a jig such as a suction nozzle or the like into contact with the third film 213. This can suppress worsening of optical properties due to occurrence of damage.

Because the critical angle between the base member 210 and the air is dependent on the difference in transmittance between the base member 210 and the air, the critical angle between the base member 210 and the air does not change regardless of presence or absence of the first film 211. Should the light emitted from the light emitting parts 1 be reflected depending on the critical angle between the base member 210 (here, the first lens 11) and the air, the light is reflected inside the light source device 200 and is incident into the base member 210 again. Here, the first film 211 can facilitate transmission of the light through the base member 210, and can hence reduce stray light.

Third Embodiment

Figure 12:
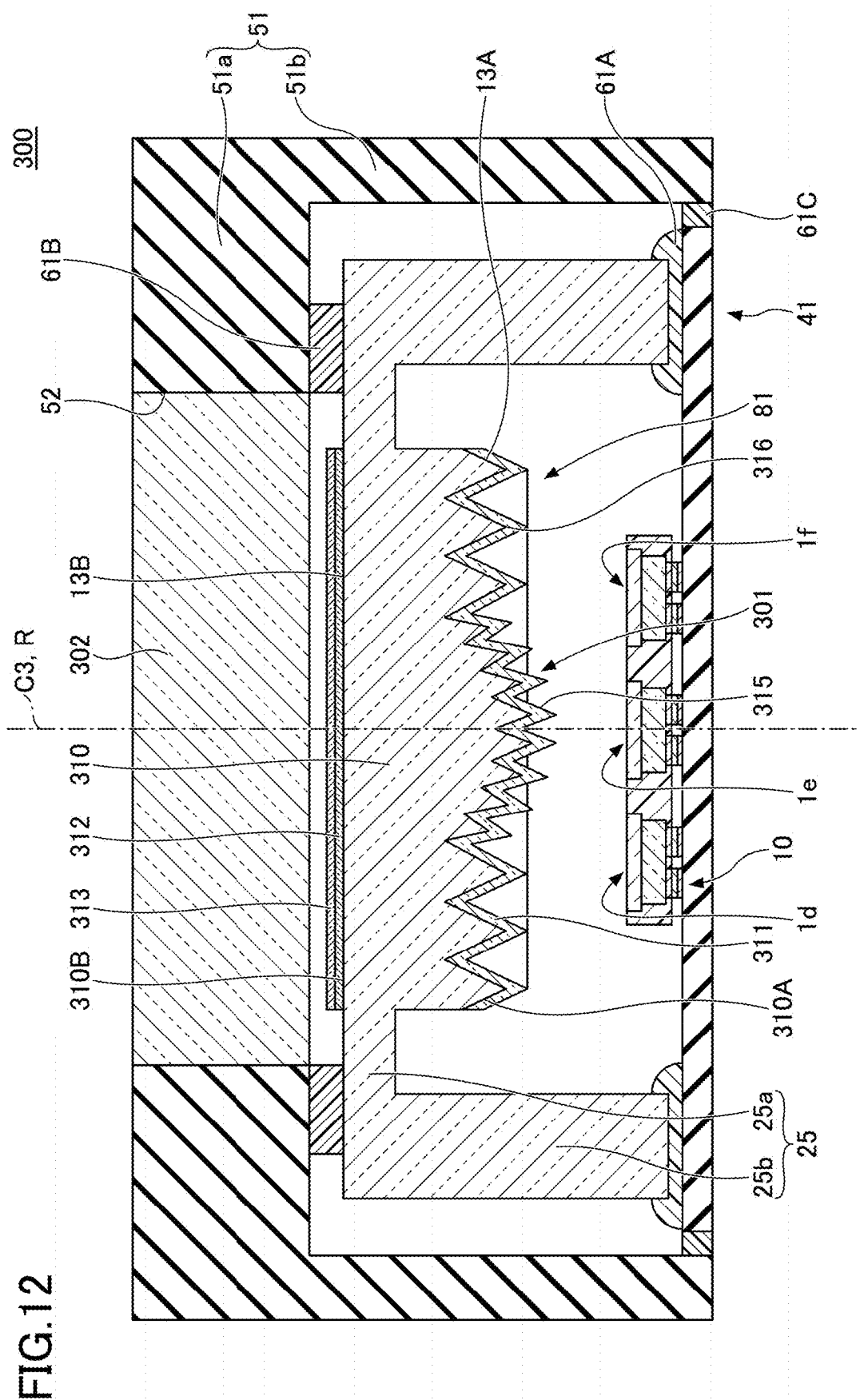
FIG. 12 is a cross-sectional view illustrating a light source device according to a third embodiment.
Figure 13:
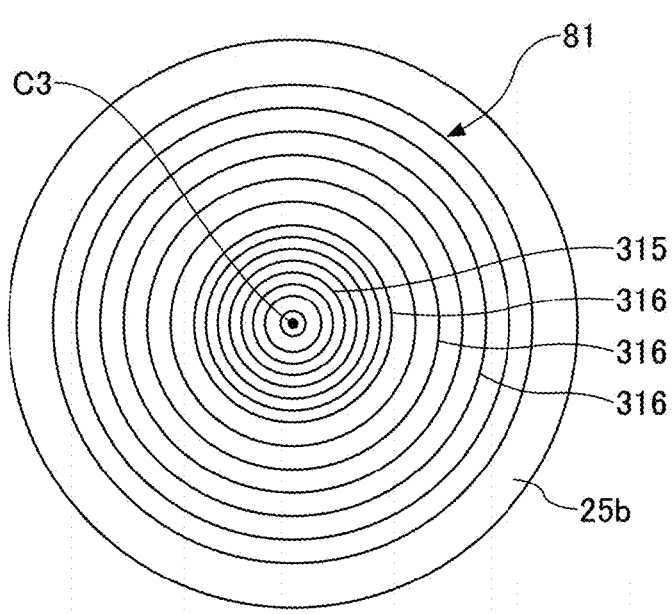
FIG. 13 is a bottom view illustrating a lens and a support according to the third embodiment.

Next, a third embodiment will be described. The third embodiment relates to a light source device. FIG. 12 is a cross-sectional view illustrating the light source device according to the third embodiment. FIG. 13 is a bottom view illustrating a lens and a support according to the third embodiment. A light source device 300 according to the third embodiment is different from the light source device 200 according to the second embodiment in the shape of a lens 81 of a first light transmissive member 301, the shape of a second light transmissive member 302, and the regions of the first light transmissive member 301 where a light transmissive first film 311, and a light transmissive second film 312 and a light transmissive third film 313 are positioned.

The first light transmissive member 301 includes a light transmissive base member 310 including the lens 81. The base member 310 includes: a light incident part 13A on a first surface 310A of the lens 81, to which light incident part 13A the light from light emitting parts 1 comes incident; and a light exiting part 13B on a second surface 310B of the lens 81, through which light exiting part 13*b* the light transmitted through the lens 81 exits. The second light transmissive member 302 is a plate-shaped member having flat surfaces on the upper surface and the lower surface, and is positioned in an opening portion 52 of a third support 51 so as to overlap with the lens 81 of the first light transmissive member 301 in a top view.

The first light transmissive member 301 includes the light transmissive first film 311 on the first surface 310A of the lens 81, and includes the light transmissive second film 312 and the light transmissive third film 313 on the second surface 310B of the lens 81. The light transmissive first film 311, and the light transmissive second film 312 and the light transmissive third film 313 are formed on regions of the first light transmissive member 301 except a first support 25. As illustrated in FIG. 13, the contours of the lens 81 and the first support 25 (a first leg 25*b*) are preferably a circle or an ellipse in a top view, yet may be a polygon such as a tetragon, a hexagon, or the like. The lens 81 has a shape formed by a plurality of annular convex parts 315 and annular convex parts 316 being arranged in the light incident part 13A and concentrically arranged centering on a light axis C3 of the lens 81. Among the plurality of convex parts 315, a convex part 315 closer to the light axis C3 of the lens 81 has a shorter distance to a substrate 41 as measured from the tip of the convex part 315. As a whole, the first surface 310A of the lens 81 has a shape that is convex toward the substrate 41 side. The plurality of convex parts 316 are positioned to surround the entire periphery of the plurality of convex parts 315. The respective convex parts 316 of the plurality of convex parts have approximately the same distance to the substrate 41 as measured from the tips of the convex parts. The lens 81 may be a Fresnel lens including the plurality of concentric convex parts 316 centering on the light axis C3 of the lens 81.

The light source device 300 according to the third embodiment can achieve an effect the same as or similar to that of the second embodiment. Moreover, in the present embodiment, because the first surface 310A of the lens 81 has the shape formed by the plurality of annular convex parts 315 and convex parts 316 being arranged concentrically, the light emitting parts 1 is less visible when the light source device 300 is seen from the second surface 310B side, and it is possible to improve the appearance.

Fourth Embodiment

Figure 14:
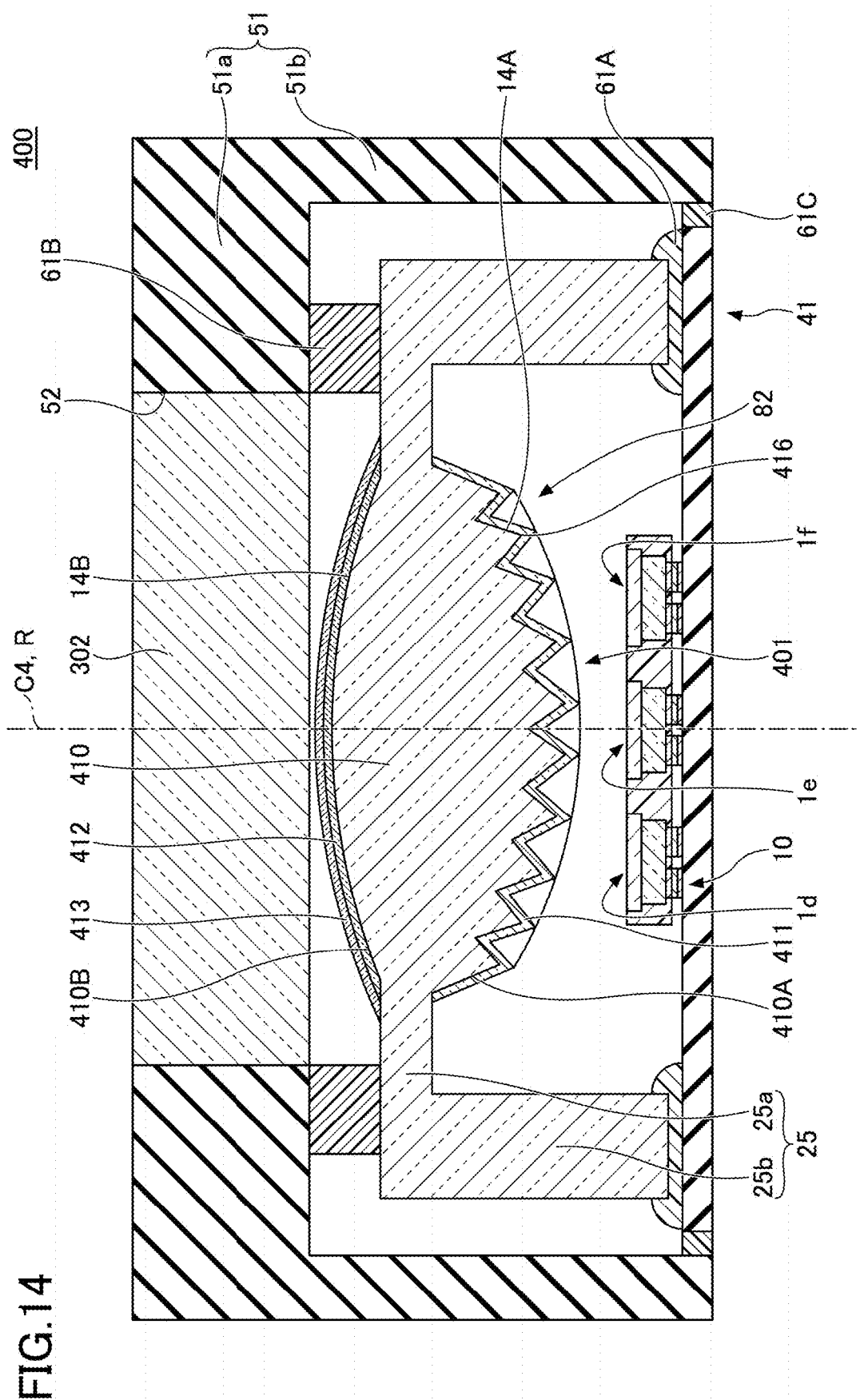
FIG. 14 is a cross-sectional view illustrating a light source device according to a fourth embodiment.
Figure 15:
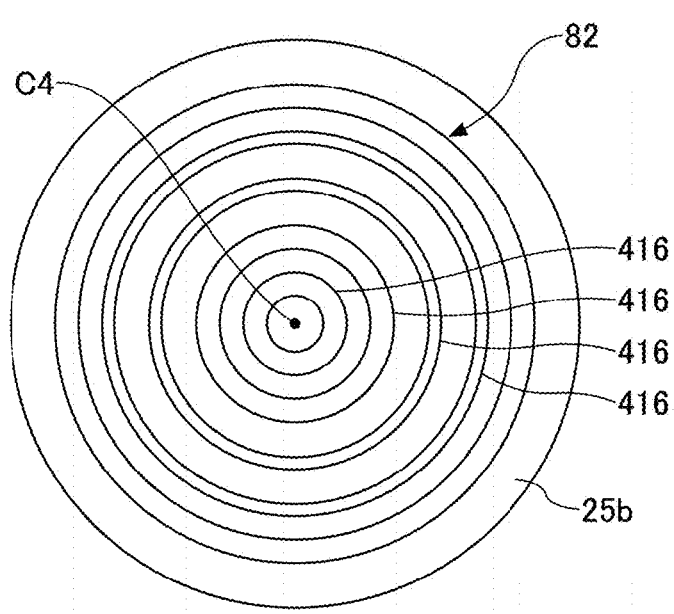
FIG. 15 is a bottom view illustrating a lens and a support according to the fourth embodiment.

Next, a fourth embodiment will be described. The fourth embodiment relates to a light source device. FIG. 14 is a cross-sectional view illustrating the light source device according to the fourth embodiment. FIG. 15 is a bottom view illustrating a lens and a support according to the fourth embodiment. A light source device 400 according to the fourth embodiment is different from the light source device 300 according to the third embodiment in the shape of a lens 82 of a first light transmissive member 401.

The first light transmissive member 401 includes a light transmissive base member 410 including the lens 82. The base member 410 includes a light incident part 14A in a first surface 410A of the lens 82 and a light exiting part 14B in a second surface 410B of the lens 82. The light incident part 14A is a part from which the light from light emitting parts 1 enters into the lens 82. The light exiting part 14B is a part through which the light transmitted through the lens 82 exits.

The first light transmissive member 401 includes a light transmissive first film 411 on the first surface 410A of the lens 82, and includes a light transmissive second film 412 and a light transmissive third film 413 on the second surface 410B of the lens 82. As illustrated in FIG. 15, the contours of the lens 82 and a first support 25 (a first leg 25*b*) are preferably a circle or an ellipse in a top view, yet may be a polygon such as a tetragon, a hexagon, or the like. The lens 82 has a shape formed by a plurality of annular convex parts 416 being arranged in the light incident part 14A and concentrically arranged centering on a light axis C4 of the lens 82. The plurality of annular convex parts 416 may form a Fresnel lens. Among the plurality of convex parts 416, a convex part 416 closer to the light axis C4 of the lens 82 has a shorter distance to a substrate 41 as measured from the tip of the convex part 416. As a whole, the first surface 410A of the lens 82 has a shape that is convex toward the substrate 41 side. The second surface 410B of the lens 82 is a convex surface protruding to a side opposite to the substrate 41 side.

The light source device 400 according to the fourth embodiment can achieve an effect the same as or similar to that of the second embodiment. Moreover, in the present embodiment, because the first surface 410A of the lens 82 has the shape formed with the plurality of annular convex parts 416 being arranged concentrically, the light emitting parts 1 is less visible when the light source device 400 is seen from the second surface 410B side, and it is possible to improve the appearance.

Fifth Embodiment

Figure 16:
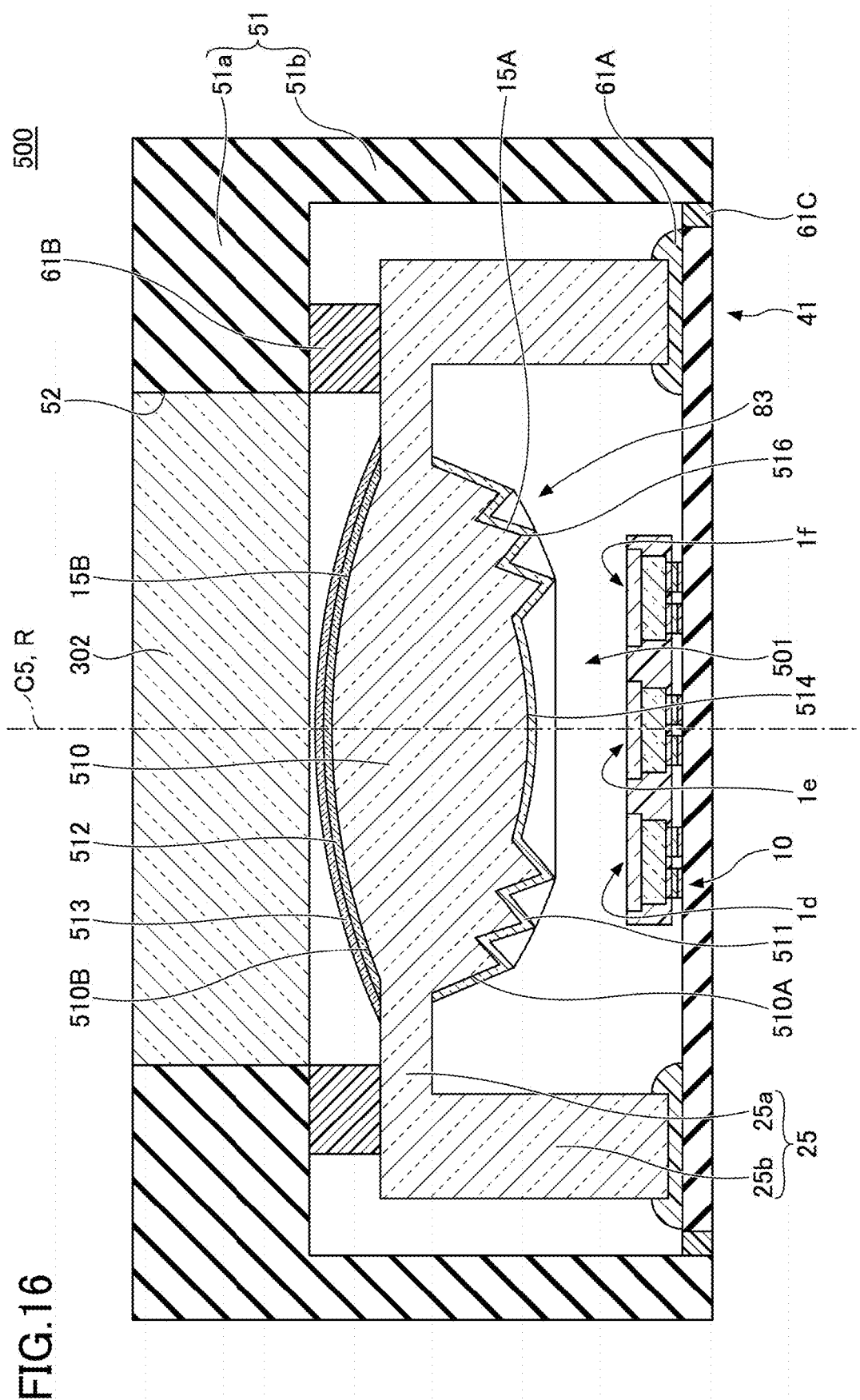
FIG. 16 is a cross-sectional view illustrating a light source device according to a fifth embodiment.
Figure 17:
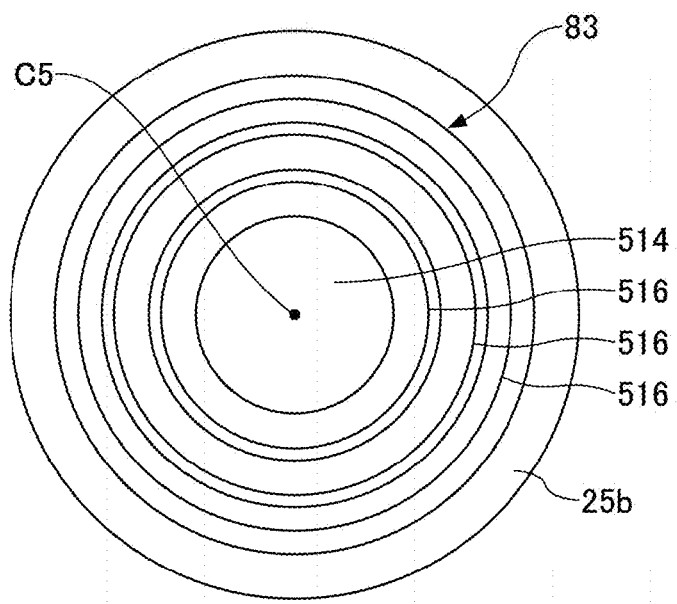
FIG. 17 is a bottom view illustrating a lens and a support according to the fifth embodiment.

Next, a fifth embodiment will be described. The fifth embodiment relates to a light source device. FIG. 16 is a cross-sectional view illustrating the light source device according to the fifth embodiment. FIG. 17 is a bottom view illustrating a lens and support according to the fifth embodiment. A light source device 500 according to the fifth embodiment is different from the light source device 300 according to the third embodiment in the shape of a lens 83 of a first light transmissive member 501.

The first light transmissive member 501 includes a light transmissive base member 510 including the lens 83. The base member 510 includes a light incident part 15A in a first surface 510A of the lens 83 and a light exiting part 15B in a second surface 510B of the lens 83. The light incident part 15A is a part from which the light from the light emitting parts 1 enters into the lens 83. The light exiting part 15B is a part through which the light transmitted through the lens 83 exits.

The first light transmissive member 501 includes a light transmissive first film 511 on the first surface 510A and a light transmissive second film 512 and a light transmissive third film 513 on the second surface 510B. As illustrated in FIG. 17, the contours of the lens 83 and the first support 25 (a first leg 25b) are preferably a circle or an ellipse in a top view, yet may be a polygon such as a tetragon, a hexagon, or the like. The lens 83 includes a lower convex surface 514 positioned in the center of the light incident part 15A and convex toward the light emitting parts 1 side, and a plurality of annular convex parts 516 arranged concentrically around the lower convex surface 514 centering on a light axis C5 of the lens 83. The plurality of annular convex parts 516 may form a Fresnel lens. Among the plurality of convex parts 516, a convex part 516 closer to the light axis C5 of the lens 83 has a shorter distance to a substrate 41 as measured from the tip of the convex part 516. As a whole, the first surface 510A of the lens 83 has a shape that is convex toward the substrate 41 side. The second surface 510B of the lens 83 is a convex surface protruding to a side opposite to the substrate 41 side.

The light source device 500 according to the fifth embodiment can achieve an effect the same as or similar to that of the second embodiment. Moreover, in the present embodiment, because the first surface 510A of the lens 83 has a shape formed with the plurality of annular convex parts 516 being arranged concentrically, the interior of the light source device 500 is less visible when the light source device 500 is seen from the second surface 510B side, and it is possible to improve the appearance.

EXAMPLES

Next, an experiment performed by the present inventor will be described. In the experiment, four samples each including a lens were produced. The first sample was a first light transmissive member including a biconvex lens like illustrated in FIG. 5, and was produced through the processes of the steps S1 to S6 of FIG. 8. A first film 211 was a hydrous alumina film, a second film 212 was an aluminum oxide film having a crystallinity lower than that of α-alumina, and a third film 213 was a silicon oxide film. The second sample was formed only of a base member 210 including a biconvex lens, and was produced through the process of the step S1 of FIG. 8. The third sample and the fourth sample were formed as follows.

The third sample was different from the first sample in that the third sample did not include a first film and a second film. Specifically, in the third sample, a silicon oxide film in contact with a first surface of a base member 210 was formed, and a silicon oxide film in contact with a second surface of the base member 210 was formed.

The fourth sample was different from the first sample in that the fourth sample did not include a first film and a second film. Specifically, in the fourth sample, an α-alumina film, a silicon oxide film, an α-alumina film, and a silicon oxide film were formed on a first surface of a base member 210 in an order that the former would be closer to the first surface. Moreover, an α-alumina film, a silicon oxide film, an α-alumina film, and a silicon oxide film were formed on a second surface of the base member 210 in an order that the former would be closer to the second surface.

Figure 18:
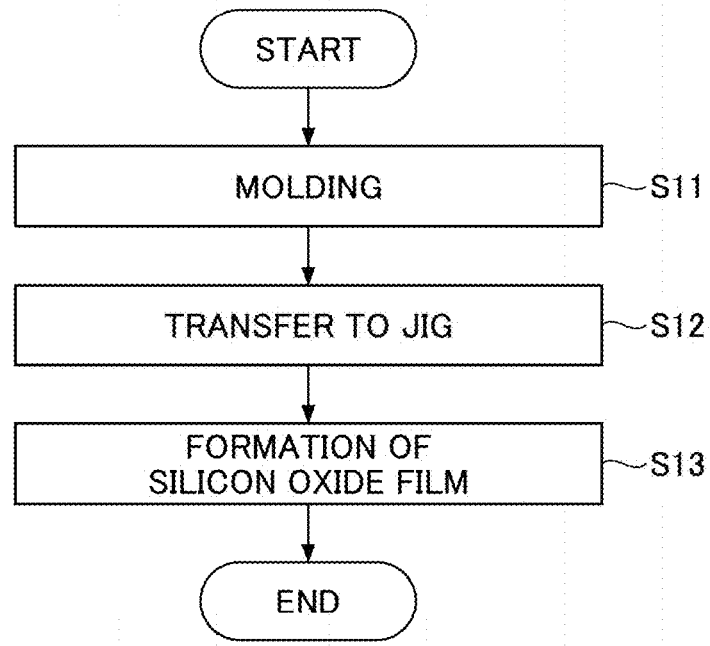
FIG. 18 is a flowchart illustrating a method for producing a third sample.

Next, the method for producing the third sample and the fourth sample will be described. FIG. 18 is a flowchart illustrating the method for producing the third sample. FIG. 19 is a flowchart illustrating the method for producing the fourth sample.

In the production of the third sample, a step of providing a base member 210 including a lens was performed. The base member 210 was produced by molding a raw material (step S11). Subsequently, a step of transferring the base member 210 onto a jig was performed (step S12).

Subsequently, a step of forming a silicon oxide film on the first surface and the second surface of the base member 210 by the ALD method at a film forming temperature of approximately 100° C. was performed (step S13).

In this way, the third sample was produced.

In the production of the fourth sample, a step of providing a base member 210 including a lens was performed. The base member 210 was produced by forming a raw material (step S21). Subsequently, a step of transferring the base member 210 onto a jig was performed (step S22).

Subsequently, a step of forming an α-alumina film on the first surface and the second surface of the base member 210 was performed (step S23).

Subsequently, a step of forming a silicon oxide film on the α-alumina film formed on the first surface and the second surface was performed (step S24).

Subsequently, a step of forming an α-alumina film on the silicon oxide film formed on the first surface and the second surface was performed (step S25).

Subsequently, a step of forming a silicon oxide film on the α-alumina film formed below the first surface and above the second surface was performed (step S26).

In the production of the fourth sample, the α-alumina films were formed by the ALD method at a film forming temperature of approximately 100° C., and the silicon oxide films were formed by the ALD method at a film forming temperature of approximately 100° C.

In this way, the fourth sample was produced.

Then, an optical property and damage resistance of the first sample, the second sample, the third sample, and the fourth sample were evaluated. In the evaluation of the optical property, the light extraction efficiency of the lens itself, and the light extraction efficiency of a light source device including the lens were measured. In the evaluation of the optical property, one light emitting part including: a light emitting element having a light emission peak wavelength of 450 nm; a wavelength conversion member provided on the light emitting element; and a cover member covering the lateral surfaces of the light emitting element and the lateral surfaces of the wavelength conversion member was used. The light emitting part emitted white light through mixing of light from the light emitting element and light converted in wavelength through the wavelength conversion member. In the evaluation of the damage resistance, conveyance simulating the transfer of the lens onto a tray during assembling of a light source device was performed once and three times, and then presence or absence of damage on the light transmissive film provided on the second surface of the lens was confirmed after both of the cases. In the conveyance of the lens onto the tray, the lens was suctioned from the second surface side by a rubber-made adsorption pad at approximately 2 N. The results are indicated in Table 1. The values in the optical property evaluation in Table 1 indicate relative light extraction efficiencies with respect to the light extraction efficiency of the second sample, which was set to be 100.0%.

TABLE 1

| Sample | Number of times conveyance was performed in damage resistance test | | Light extraction efficiency (%) | |
|---|---|---|---|---|
| | Once | Three times | Lens | Light source device |
| First sample | Absent | Absent | 108.8 | 107.4 |
| Second sample | — | — | 100.0 | 100.0 |
| Third sample | Absent | Absent | 103.3 | 103.5 |
| Fourth sample | Absent | Absent | 104.0 | 104.1 |

As indicated in Table 1, the first sample includes the first film containing brittle hydrous alumina on the first surface while including the third film, harder than the first film and the second film, on the second surface. This enabled the first sample to have a good damage resistance as those of the third sample and the fourth sample without occurrence of damage on the surface of the first light transmissive member by conveying the first light transmissive member by bringing a jig such as a suction nozzle or the like into contact with the third film during assembling of the light source device. Moreover, the first sample achieved higher light extraction efficiencies than those of the third sample and the fourth sample. This is because the hydrous alumina film was provided as the first film on the first surface of the base member 210 serving as the light incident surface.

In this experiment, the first film containing hydrous alumina was formed on the first surface of the base member 210 serving as the light incident surface. However, the first film containing hydrous alumina may be formed on the second surface of the base member 210 serving as the light exiting surface, and the third film may be formed on the first surface of the base member 210 serving as the light incident surface. In this case, by conveying the first light transmissive member by bringing a jig such as an adsorption nozzle or the like into contact with the third film formed on the first surface during assembling a light source device, a damage on the surface of the first light transmissive member is less likely to occur. Moreover, the first light transmissive member includes the first film containing hydrous alumina on the second surface serving as the light exiting surface, and thus the light extraction efficiency can be improved as with the first sample.

Preferred embodiments and other particulars have been described above in detail. However, the present disclosure is not limited to the embodiments and other particulars described above, and various modifications and replacements are applicable to the embodiments and other particulars described above without departing from the scope defined in the claims.

Because of their good light extraction efficiencies, the light transmissive member and the light source device according to the embodiments of the present disclosure can be suitably used in flash light sources, and headlighting light sources as vehicle light fitting. In addition, the light transmissive member and the light source device according to the embodiments of the present disclosure can be used in backlighting light sources for liquid crystal displays, various lighting equipment, large-size displays, and various display devices for advertisements, direction guides, and the like. However, the light source device of the present disclosure is not limited to these uses.

What is claimed is:

1. A light transmissive member, comprising:
   a light transmissive base member having a first surface, and a second surface on a side opposite the first surface;
   a light transmissive first film covering at least part of the first surface;
   a light transmissive second film covering at least part of the second surface; and
   a light transmissive third film covering the second film, wherein:
   the first film contains hydrous alumina,
   the second film contains aluminum oxide having a crystallinity lower than a crystallinity of α-alumina, and
   a hardness of the third film is higher than a hardness of the second film.

2. The light transmissive member according to claim 1, wherein:
   the first film has a thickness of 200 nm or greater and 300 nm or less, and/or
   the second film has a thickness of 25 nm or greater and 45 nm or less, and/or
   the third film contains a silicon oxide film having a thickness of 80 nm or greater and 135 nm or less.

3. The light transmissive member according to claim 1, wherein:
   each of the first surface and the second surface includes a convex surface.

4. The light transmissive member according to claim 1, wherein:
   the first surface includes a total reflection surface.

5. The light transmissive member according to claim 1, wherein:
   the base member is a lens.

6. A light source device, comprising:
   a light emitting part; and
   the light transmissive member of claim 1, the light transmissive member being positioned in a path of light emitted from the light emitting part.

7. The light source device according to claim 6, wherein:
   the base member is a lens,
   the light emitting part has a light emitting surface, and
   the first film, a light axis of the lens, and the light emitting surface overlap with each other in a top view.

8. The light source device according to claim 6, wherein:
   in the base member, the light emitted from the light emitting part enters from the first surface and exits through the second surface.

9. The light source device according to claim 6, wherein:
   the light source device is a flash light source.

* * * * *